(12) United States Patent
Stoebe et al.

(10) Patent No.: US 6,302,599 B1
(45) Date of Patent: Oct. 16, 2001

(54) THERMAL FILM CAMERA WITH PROCESSING

(75) Inventors: Timothy W. Stoebe, Victor; Richard P. Szajewski, Rochester; David H. Levy, Rochester; Lyn M. Irving, Rochester, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/388,573

(22) Filed: Sep. 1, 1999

(51) Int. Cl.[7] .................................................. G03B 13/00
(52) U.S. Cl. .............................................................. 396/575
(58) Field of Search ................. 396/30, 575; 355/27–29; 250/332; 358/474, 487; 430/350, 353

(56) References Cited

U.S. PATENT DOCUMENTS

| | | | |
|---|---|---|---|
| 4,021,240 | 5/1977 | Cerquone et al. | 430/203 |
| 4,031,393 * | 6/1977 | Redman | 250/332 |
| 4,035,074 * | 7/1977 | Flor | 355/27 |
| 4,278,335 * | 7/1981 | Vincett et al. | 355/27 |
| 4,285,588 | 8/1981 | Mir | 396/180 |
| 4,331,400 | 5/1982 | Brownstein et al. | 396/159 |
| 4,479,705 | 10/1984 | Tamamura et al. | 396/418 |
| 4,710,013 | 12/1987 | Wong | 396/98 |
| 4,727,389 | 2/1988 | Raschke | 396/103 |
| 4,792,820 | 12/1988 | Norita et al. | 396/130 |
| 4,834,306 | 5/1989 | Robertson et al. | 242/204 |
| 4,860,045 | 8/1989 | Hamada et al. | 396/95 |
| 4,893,148 * | 1/1990 | Sanada et al. | 355/27 |
| 4,965,628 | 10/1990 | Olliver et al. | 355/41 |
| 5,003,334 | 3/1991 | Pagano et al. | 396/515 |
| 5,032,854 | 7/1991 | Smart et al. | 396/207 |
| 5,215,874 | 6/1993 | Sakakibara | 430/496 |
| 5,229,585 | 7/1993 | Lemberger et al. | 235/375 |
| 5,382,997 | 1/1995 | Sato et al. | 396/213 |
| 5,406,348 | 4/1995 | Wheeler | 396/166 |
| 5,583,591 | 12/1996 | Saito et al. | 396/429 |
| 5,587,767 | 12/1996 | Islam et al. | 396/575 |
| 5,667,944 | 9/1997 | Reem et al. | 430/30 |
| 5,684,610 | 11/1997 | Brandestini et al. | 358/498 |
| 5,698,365 | 12/1997 | Tuguchi et al. | 430/203 |
| 5,720,038 | 2/1998 | Fukuhara et al. | 396/158 |
| 6,048,110 * | 4/2000 | Szajewski et al. | 396/575 |
| 6,062,746 * | 5/2000 | Stoebe et al. | 396/575 |

FOREIGN PATENT DOCUMENTS

| | | |
|---|---|---|
| 2318645 | 4/1998 | (GB) . |
| 11-52517 * | 2/1999 | (JP) . |
| 11-295856-A * | 10/1999 | (JP) . |
| 217040-A * | 5/1982 | (ZW) . |

OTHER PUBLICATIONS

Research Disclosure 17029, Jun. 1978, Photothermographic Silver Halide Systems.
Research Disclosure 29963, Mar. 1989, Photothermographic Silver Halide Systems.

* cited by examiner

Primary Examiner—D. Rutledge
(74) Attorney, Agent, or Firm—Paul A. Leipold

(57) ABSTRACT

The invention relates to a camera for thermal development comprising a receiving chamber for a film supply cartridge, drive means to advance thermal film from said film supply cartridge, a lens and exposure control system to accurately capture scene information onto thermally developable film, an optical writer to write information onto the thermally developable film, a magnetic reader and writer to read and write magnetic information onto the film, a heater to develop said thermal film, a scanner to scan the thermally developed film, a display, and a light-tight container for said chamber and heater.

24 Claims, 9 Drawing Sheets

THERMAL FILM CAMERA WITH PROCESSING

FIELD OF THE INVENTION

The present invention relates to a camera and method for providing exposed and developed thermally developable film. It particularly relates to a camera and method for exposing film and developing that film by applying heat to the film. It further relates to a processor for developing exposed thermally developable film. It also relates to a camera and a method for optically writing information or graphics onto thermally developable film. It additionally relates to a camera and a method for optically scanning thermally developed film. It also relates to a camera and method for reading and writing magnetic and optical information onto thermally developable film.

BACKGROUND OF THE INVENTION

In the conventional practice of color photography, silver halide film is developed by a chemical technique, requiring several steps consisting of latent image development, bleaching, and fixing. While this technique has been developed over many years and results in exceptional images, the technique requires several liquid chemical solutions and precise control of times and temperatures of development. Further, the conventional silver halide chemical development technique is not particularly suitable for utilization with compact developing apparatus. The chemical technique also is not easily performed in the home or small office and is certainly not suitable for use in a hand-held camera.

Imaging systems that do not rely on conventional wet processing have received increased attention in recent years. In one approach, known as instant photography and popularized by Land and co-workers, a specially prepared sheet film is exposed and processed in a camera by the mechanical application of a viscous high pH fluid containing a developing agent and other addenda. Only a single image is produced and the ability to provide a compact camera is limited by the size of the desired image. Further, the dye images produced are limited in stability and capacity for magnification by the inherent characteristics of the system.

In a distinct art, photothermographic imaging systems have been employed for producing silver images. Typically, these imaging systems have exhibited very low levels of radiation-sensitivity and have been utilized primarily where only low imaging speeds are required. The most common use of photothermographic elements is for copying documents and radiographic images. A method and apparatus for developing a heat developing film is disclosed in U.S. Pat. No. 5,587,767—Islam et al. Summaries of photothermographic imaging systems are published in *Research Disclosure,* Vol. 170, June 1978, Item 17029, and Vol. 299, March 1989, Item 29963. Thermally developed films have not been generally utilized in color photography. However, heat development color photographic materials have been disclosed, for example, in U.S. Pat. No. 4,021,240—Cerquone et al. and U.S. Pat. No. 5,698,365—Taguchi et al. Commercial products such as Color Dry Silver supplied from Minnesota Mining and Manufacturing Co. and PICTROGRAPHY® and PICTROSTAT® supplied by Fuji Photo Film Co., Ltd. have been put on the market. Furthermore, U.K. Publication 2,318,645 discloses an imaging element capable of providing a retained viewable image when imagewise exposed and heated.

A recent innovation in color negative film has made use of a thrust cartridge containing color negative film. Such cartridges are disclosed in U.S. Pat. No. 4,834,306—Robertson et al and U.S. Pat. No. 5,003,334—Pagano et al. The film contained in such a thrust cartridge can contain a magnetic layer that allows recording of information during manufacture, exposure, and development of the film. Such film is disclosed in U.S. Pat. No. 5,215,874—Sakakibara. The film and cartridge can contain additional provisions for data storage such as DX bar code data and frame number bar code data. Such elements are disclosed in U.S. Pat. No. 5,032,854—Smart et al, U.S. Pat. No. 5,229,585—Lemberger et al, and U.S. Pat. No. 4,965,628—Olliver et al. The thrust cartridge can also be made light-tight so that unexposed or imagewise exposed film that has been rewound into the cartridge can be stored without further exposure of the film within the cartridge. These thrust cartridge films have the advantage that they can be more easily manipulated for copying, digital reading, and storage.

Camera and image capture apparatus technology has been developed over many years and a substantial literature exists. Numerous disclosures relate to exposure optimization by controlling the aperture and the shutter speed of the imaging system. Examples of disclosures relating to exposure control include U.S. Pat. No. 5,382,997—Sato et al and U.S. Pat. No. 4,792,820—Norita et al. Many disclosures exist relating to electronic flash. For example; U.S. Pat. No. 5,720,038—Fukuhara et al and U.S. Pat. No. 4,285,588—Mir disclose means to reduce red-eye effects, U.S. Pat. No. 4,331,400—Brownstein et al discloses a means to improve exposure by selecting between fill-in and full flash modes, and many disclosures relate to metering means to determine ambient light conditions and subsequent control of the flash as in U.S. Pat. No. 4,727,389—Raschke. Other photographic camera disclosures relate to format selection. For example, U.S. Pat. No. 5,583,591—Saito et al describes a system in which the format of the picture (i.e. panoramic, HDTV, or normal) can be selected at the time of the exposure. Film position control necessary for accurate frame exposure is addressed in disclosures such as U.S. Pat. No. 4,479,705—Tamamura et al and U.S. Pat. No. 5,583,591—Saito et al. Numerous systems have been described to perform autofocus functions in photographic cameras. Examples include U.S. Pat. No. 5,406,348—Wheeler, U.S. Pat. No. 4,710,013—Wong, and U.S. Pat. No. 4,860,045—Hamada et al. Present camera systems typically yield excellent results. However, due to the lack of suitable photothermographic film elements, present camera technology has not been applied to photothermographic systems. There is a need to provide image capture capabilities for camera speed photothermographic systems.

The importance of information such as film type, film speed, film exposure information, and information relevant to the processing and subsequent use (e.g. printing or optical scanning) of the film is well understood. Virtually transparent magnetic layers or stripes on film provide a means to record such information. These magnetic layers or stripes provide for the recording of information during film manufacture, reading and/or recording of information during camera use, and reading and/or recording information during subsequent processing or optical scanning. There is a need to read and write magnetic data on thermographic film associated with image capture, thermal processing, and/or optical scanning. Reading and writing information on a magnetic coating or stripe on thermographic film requires solutions to problems different than those encountered in other apparatus. For example, the thermal development conditions may degrade and potentially erase the magnetic information stored on the film. There is therefore a need to read and store the magnetic information so that it can be rewritten onto the film after thermal processing.

The function of a film scanner is to measure optical density at many points on the film being scanned. The density of each pixel, or smallest region of the film being sensed, is measured by illuminating the region with light of a known light intensity and measuring the intensity of the light that is transmitted through the film. Color scans require measuring transmitted light intensity over known spectral bands. Such techniques are disclosed in U.S. Pat. No. 5,684,610—Brandestini et al. The transmitted light intensity can be measured electronically and the electronic record of the transmitted light can be digitized and stored as an electronic file representation of the film image.

The importance and utility of an electronic record of film images is widely known in the art. The electronic file can be easily duplicated and extensively manipulated. Color balance and tone scale can be adjusted. Sharpening and other algorithms to alter image structure can be applied. Annotations and/or graphical elements can be added to the film image data file. The scene can be easily cropped and digitally zoomed. An electronic record of a film image can be easily transmitted and communicated through known electronic communication networks. The electronic record of a film image can also be output to a variety of output devices including ink-jet and thermal wax digital printers. The electronic record can also be manipulated and stored in mass storage devices for rapid retrieval and subsequent processing. There is a need to optically scan thermographic film to provide an electronic file record of the film image information.

Optical writing of sensitometric tables and test patches onto conventional wet processed film to improve imaging system performance is known in the art. Such techniques are disclosed in U.S. Pat. No. 5,667,944—Reem et al. Optical writing of calibrated tablets and patches onto unexposed portions of film is of significant utility. Inspection of processed calibrated tablets or patches allows the processing conditions to be optimized for the remainder of the filmstrip. Furthermore, analysis of the calibrated tablets or patches allows printing and/or scanning algorithms to be refined to achieve an advantaged print or more useful electronic record of the film image data. For example, tone scale and color balance can be corrected and adjusted based on data obtained from calibrated tablets or patches. Optical writing provides a means to store other information on the film such as data associated with processing or scanning conditions. Optical writing also allows information to be written onto exposed regions of the film. For example, a time and date stamp that is readily apparent in a print can be written onto the film at the time of processing. Furthermore, by controlling the optical writing, graphical elements can be added to the original scene prior to processing. There is a need to provide for optical printing onto thermally developable film.

PROBLEM TO BE SOLVED BY THE INVENTION

There is a need for a compact thermal film development system with the capability of exposing a scene onto a thermally developable film. There is also a need for a compact camera that can both expose a scene onto a thermally developable film and thermally process that film. There is a further need for a compact camera and processor with the capability of scanning the thermally developable film. There is also the need for a compact processor with the capability of displaying the image captured on the thermally developed film. There is additionally a need for a compact camera and processor with the capability to write optical information onto thermally developable film. There is also a need for a compact camera and processor with the capability to read and write magnetic information on the film.

SUMMARY OF THE INVENTION

It is an object of the invention to overcome disadvantages of prior art cameras and prior art processors for thermal film and the complicated, awkward procedures for wet-processing conventional films.

It is another object of the invention to provide a means to capture a scene onto a thermal developable film.

It is a further object of the invention to provide a means to both capture a scene onto a thermally developable film and to thermally develop that film.

It is yet another object to provide an improved method of development of thermal film in a thrust cartridge.

It is another object to provide more convenient and rapid processing of thermal film to the individual user.

It is an additional object to provide a means to scan the thermal film.

It is yet another object of the invention to provide a camera and processor capable of displaying a captured image for user approval.

It is another object to provide a means to write optical information on the thermal film.

It is a further object to provide a means to read and write magnetic information associated with the thermal processing on the thermal film.

These and other objects of the invention are accomplished by a camera for thermal development comprising a receiving chamber for a thrust cartridge, drive means to advance thermal film from said thrust cartridge and rewind film into said thrust cartridge, a lens and exposure control means to capture a scene onto thermally developable film, magnetic sensing devices to record and write magnetic information, an accumulator to gather said film after it has left the cartridge, a heater located between said chamber and said accumulator to develop said thermal film as it passes between said cartridge and said accumulator, a scanning means to scan the thermal film, an optical writing means to write optical information onto said thermal film, and a light-tight container for said magnetic devices, chamber, heater, and accumulator.

ADVANTAGEOUS EFFECT OF THE INVENTION

The invention provides a compact, convenient camera and method for processing of film contained in a thrust cartridge. It provides a means to accurately capture a scene onto thermally developable film. It provides a means to scan the thermal film to form an electronic record of image data that can be readily processed, displayed for user approval, stored, printed, or transmitted. It provides a means to write optical information to alter film image frames and to facilitate optimal thermal processing and scanning by writing sensitometric tables. It also provides a means to record and write magnetic information to effect optimal subsequent processing. It further provides a camera and a method of processing of color thermal films that is convenient and compact.

DETAILED DESCRIPTION OF THE INVENTION

The invention has numerous advantages over prior methods of exposing thermal films. It further provides advantages over previous methods of processing thermal film, particularly thermal film provided with means to store magnetic information contained in thrust cartridges. The camera of the invention has the advantage that the individual user of thermal film cartridges can process the cartridges in a convenient and low-cost system. Further this can be done contemporaneously with scene capture, and in conjunction with a viewing device, allows easy verification of image capture and composition. The camera of the invention has the advantage that it provides a lens, an aperture, and a shutter system to allow scene information to be accurately captured onto thermal film. The camera of the invention has the advantage that magnetic information can be sensed and written on to the film. This information can be used to control subsequent processing or optical scanning. The invention has the advantage that it provides an optical writer to write optical information onto the film. The invention has the advantage that it provides an optical scanner to create an electronic file record of film image information. The invention has the additional advantage that it provides a display of captured scene information thereby allowing rapid and convenient verification of image content. The invention further has the advantage that it provides a means that is easily connected to a personal computer and electrical power source for control and development of thermal film. The invention provides a camera that is low in power requirements, while producing rapid developing for the individual user. The invention provides a camera that is easily transported. These and other advantages will be apparent from the detailed description below.

Figure 1:
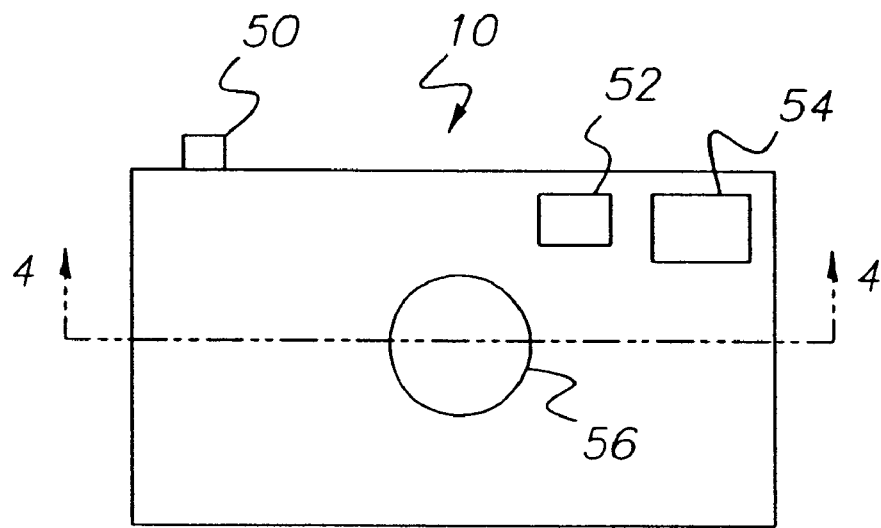
FIG. 1 is a front view of compact thermal development and image capture camera of the invention.
Figure 2:
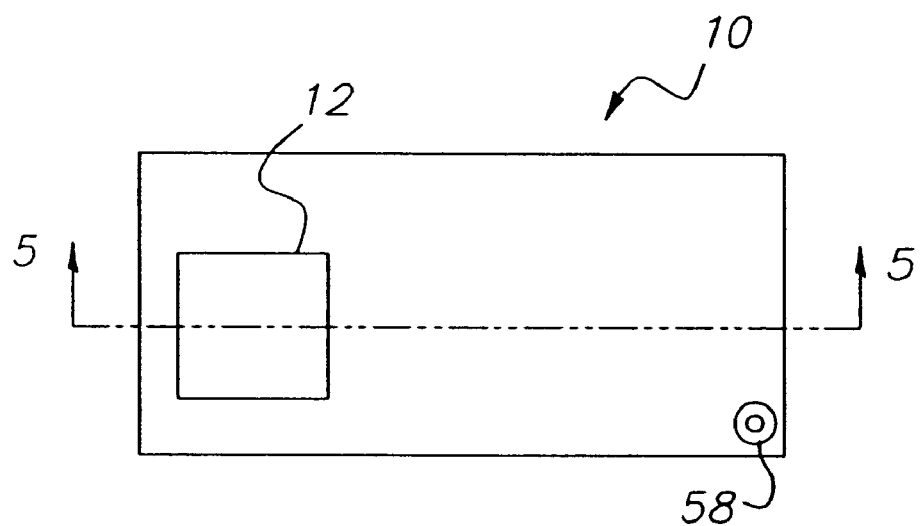
FIG. 2 is a bottom view of the camera of the invention.
Figure 3:
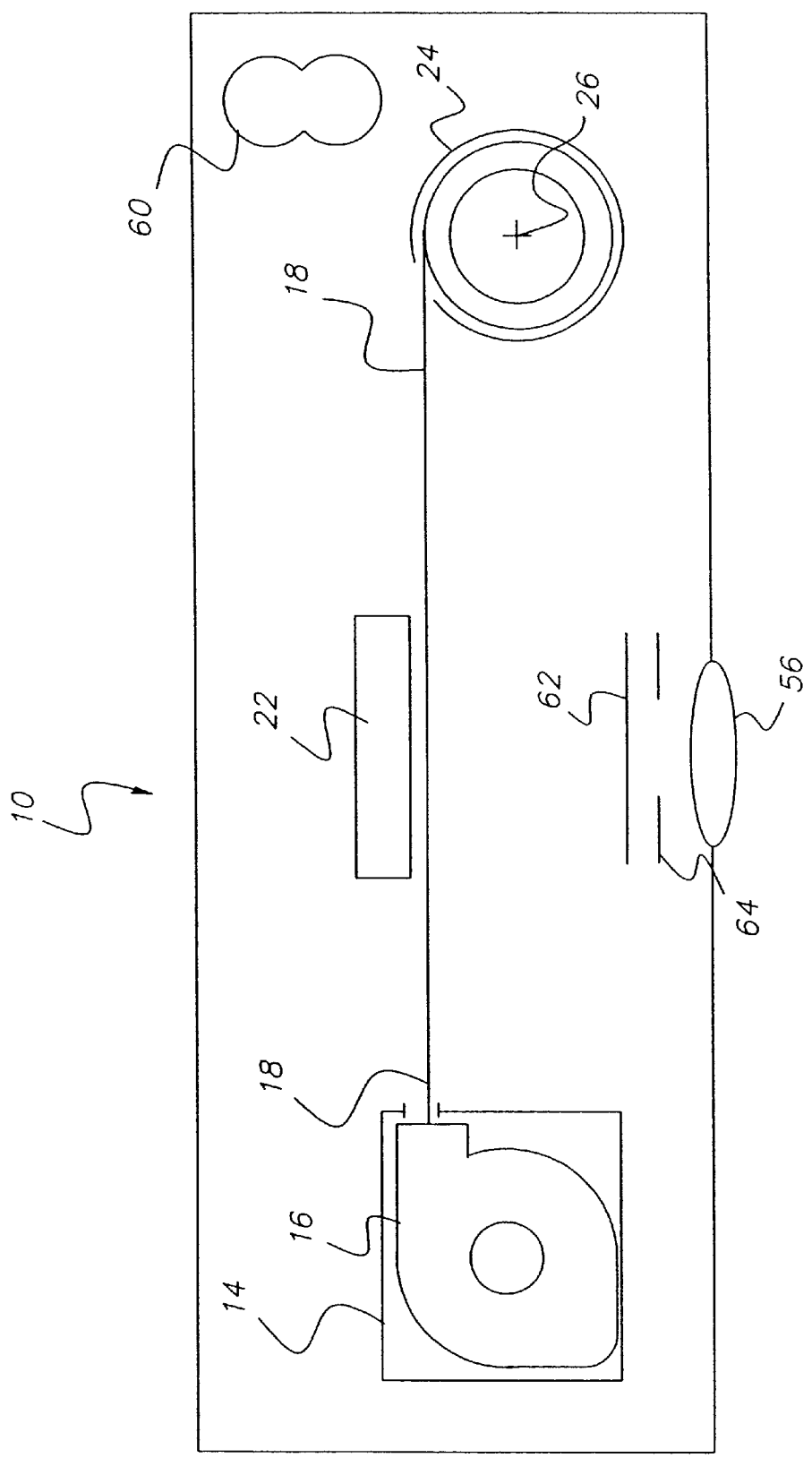
FIG. 3 is a cross-sectional view on line 4—4 of FIG. 1.
Figure 4:
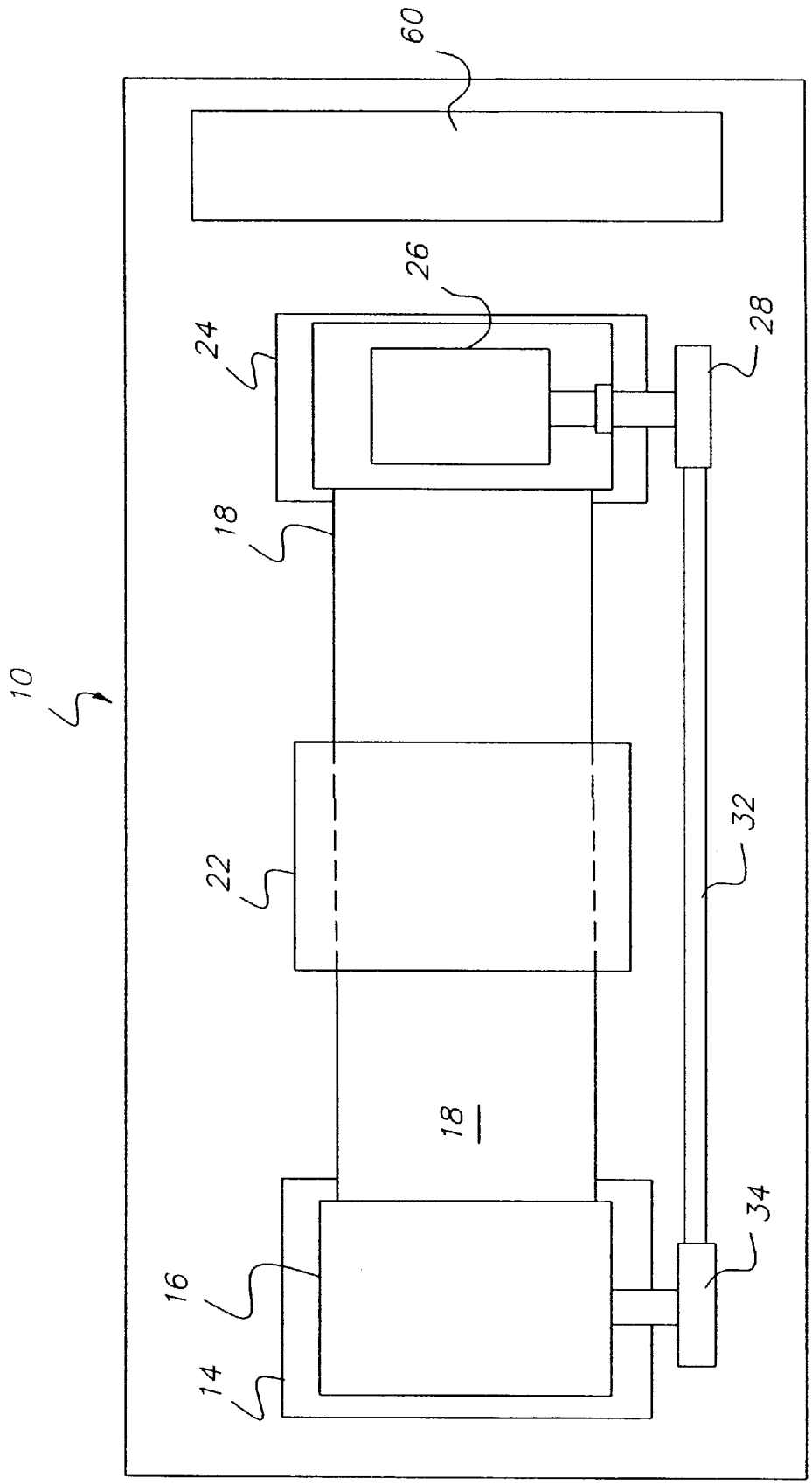
FIG. 4 is a cross-sectional view on line 5—5 of FIG. 2.

As illustrated in FIGS. 1 and 2 there is provided compact camera 10. The camera 10 is light tight so that the thermal film is not exposed to light prior to the scene exposure or thermal development. The camera has a light-tight door 12 for opening and inserting a thrust cartridge. The camera 10 is further provided with a lens 56 to focus scene information onto unexposed thermal film. The camera 10 is further provided with a switch 50 to activate the shutter. The scene can be framed using the viewfinder 52. The camera 10 is further provided with a flash 54 for scene illumination and exposure control. The camera can also be provided with electrical contacts 58 to provide electrical power and control to the camera. As shown in FIG. 3, the camera 10 contains a chamber 14 for accepting the thrust cartridge 16. The thrust cartridge as it is unwound has film 18 pass into accumulator 24. The film 18 is then wound onto accumulator 24. Accumulator 24 is driven by motor 26 located within the accumulator. A lens 56 is provided to focus scene information through an aperture 64 and a mechanical shutter 62 onto unexposed thermal film 18 at the image plane. Batteries 60 are provided to provide electrical power to the camera. In FIG. 4, the drive for cartridge 16 is transmitted from motor 26. Motor 26 transfers through driven sprocket 28 through a series of gears 32 to sprocket 34 that simultaneously drives film from thrust cartridge 16 as it is wound into accumulator 24. As the film 18 passes between the thrust cartridge 16 and accumulator 24, it passes over a heater 22.

Figure 5:
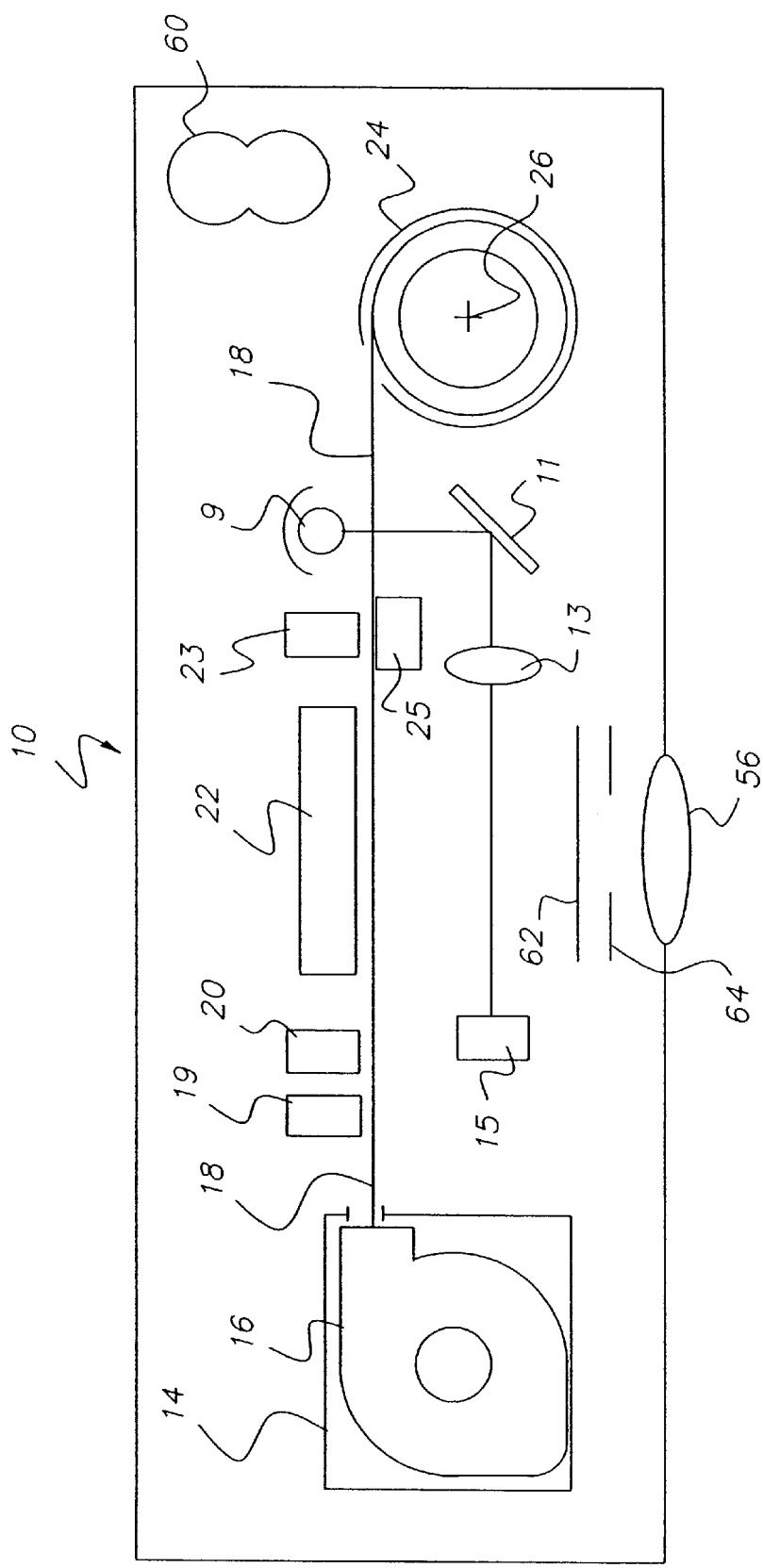
FIG. 5 is an alternative cross-sectional view on line 4—4 of FIG. 1 showing scanning means and additional sensing means.

A typical scanner utilizes a light source to provide illumination and an optical detector to determine the optical density of the film by measuring the intensity of the light transmitted through the film. An imagewise scan of a film image frame can be obtained by using an appropriate light source and a linear detector array that scans the entire width of the film as the film is driven lengthwise across the scanner. In FIG. 5, the film 18 is shown to pass between a light source 9 and a mirror 11 as the film 18 is thrust between the thrust cartridge 16 and accumulator 24. The light generated by light source 9 and transmitted through the film 18 is reflected by mirror 11 and focused by lens system 13 to be detected by optical detector 15. The electronic record of the film image data can be created by recording the output of the optical detector in relation to the relative position of the film image frame and the optical scanner. In FIG. 5, the film 18 is also shown to pass between a light source 23 and photodetector 25. Light source 23 can be controlled to write optical information onto the film. Photodetector 25 can be used to calibrate light source 23 to provide a known exposure of the film 18. In FIG. 5 the film is shown to pass over a magnetic reading head 19 and magnetic writing head 20 as the film 18 passes between the thrust cartridge 16 and accumulator 24. The magnetic reading head 19 and magnetic writing head 20 can be used to read and write magnetic information onto suitable thermal film to control subsequent processes and record processing conditions.

Figure 6:
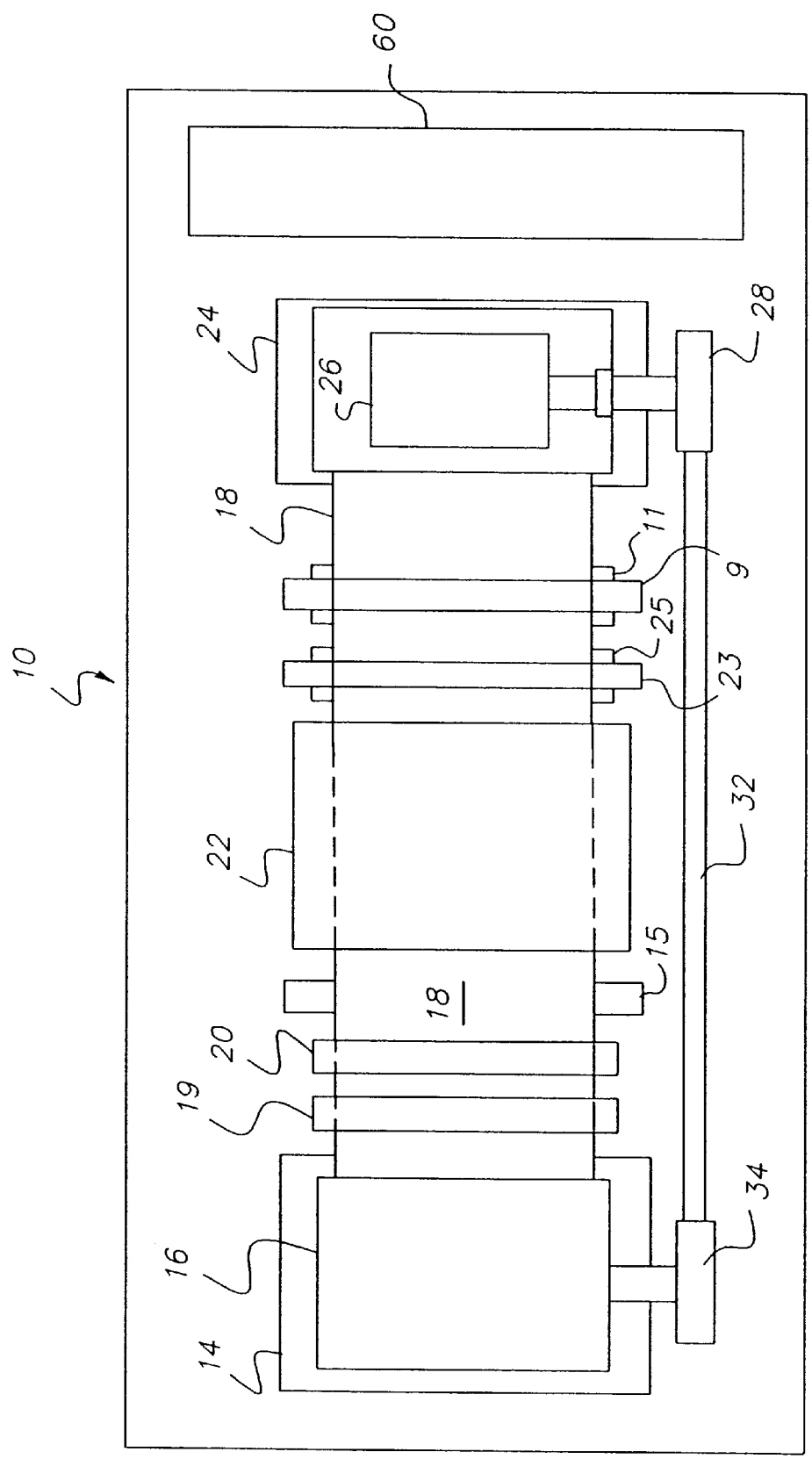
FIG. 6 is an alternative cross-sectional view on line 5—5 of FIG. 2 showing scanning means and additional sensing means.

In FIG. 6, the film 18 is shown to pass under the magnetic reading head 19 and the magnetic writing head 20 and under the heater 22. The film 18 is also shown to pass between the light source 23 and the photodetector 25 used to read and write optical information onto the film. The film 18 is also shown to pass between the optical scanner light source 9 and the mirror 11 that redirects the transmitted scanned light to a photodetector 15.

Figure 7:
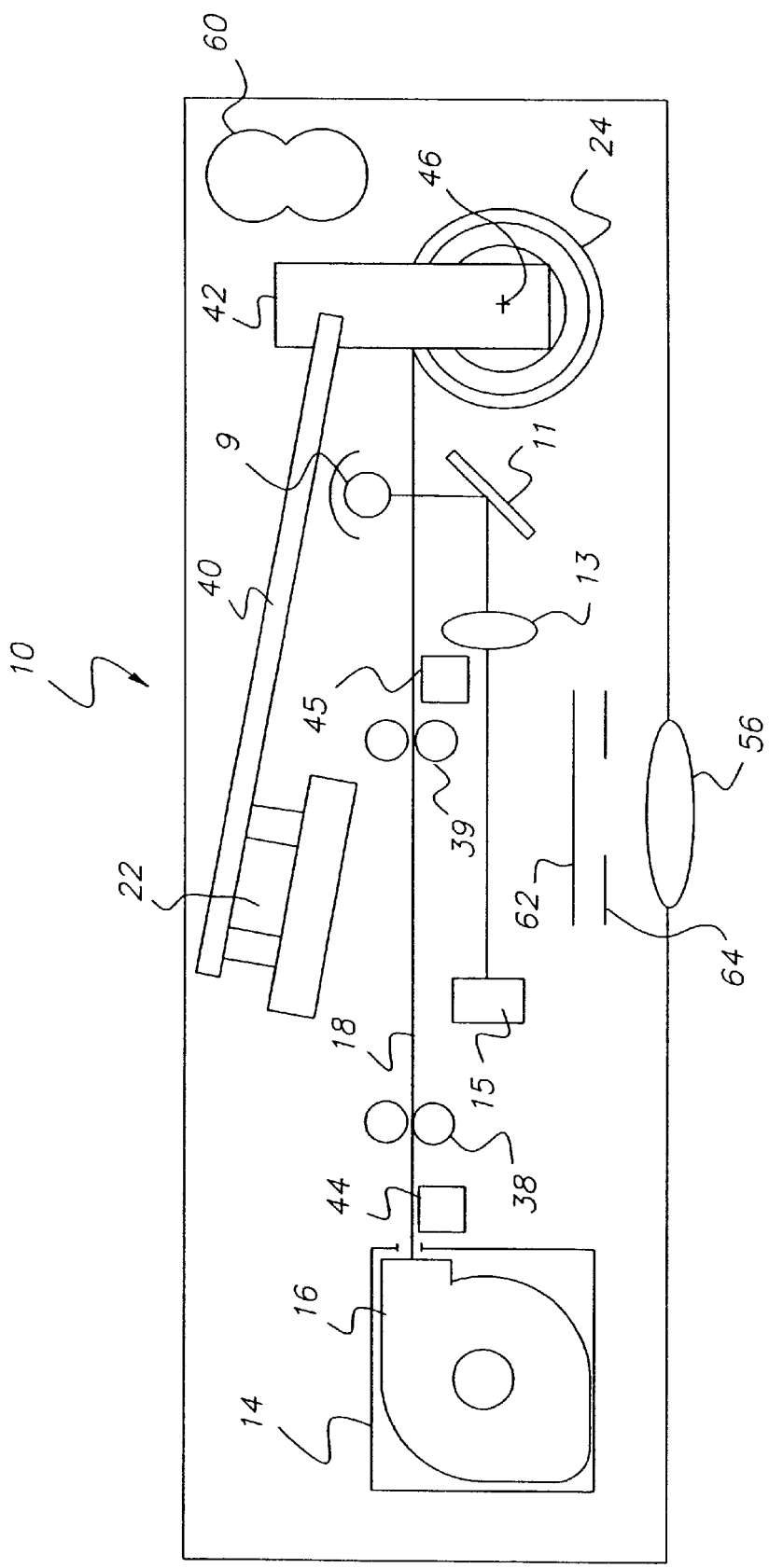
FIG. 7 is an alternative cross-sectional view on line 4—4 of FIG. 1 showing means to remove a heater from a film path.

In FIG. 7, the film 18 is shown to pass through guide rollers 38 and 39, and the heater 22 is shown to be supported by an armature 40 that can be actuated by a motor 46 located within the accumulator 24 through an assembly of gears 42 to translate the heater 22 into and out of close proximity to the path of the film 18. The mechanism is constructed to actuate the armature in response to preset conditions or in response to signals provided by sensors 44 and 45. Sensors 44 and 45 are designed to monitor a plurality of parameters including film speed, film location, temperature, frame advancement, and fault conditions such as film breakage, film jam, and heater malfunction.

Figure 8:
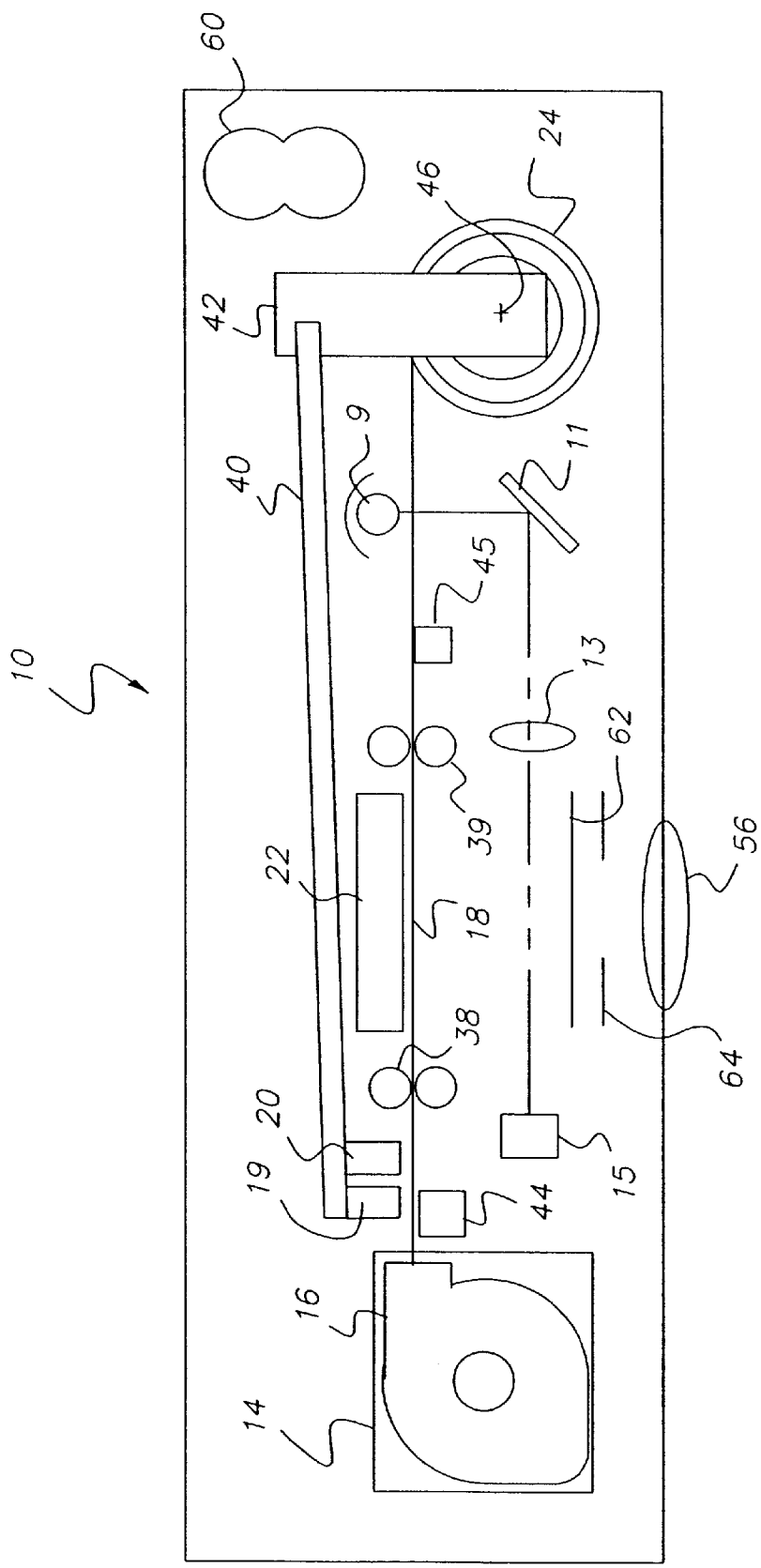
FIG. 8 is an alternative cross-sectional view on line 5—5 of FIG. 2 showing means to remove sensors from a film path.

In FIG. 8, the film 18 is shown to pass through guide rollers 38 and 39, and the magnetic writing head 20 and magnetic reading head 19 are shown to be supported by an armature 48 that can be actuated by a motor 46 through an assembly of gears 42 to translate the magnetic writing head 20 and the magnetic reading head 19 into and out of close proximity of the path of the film. The mechanism is constructed to actuate the mechanism in response to preset conditions or in response to signals provided by the magnetic reading head 19 or sensors 44 and 45. Sensors 44 and 45 are designed to monitor a plurality of parameters including film speed, film location, temperature, frame advancement, and fault conditions such as film breakage, film jam, and heater or magnetic reader or magnetic writer malfunction.

Figure 9:
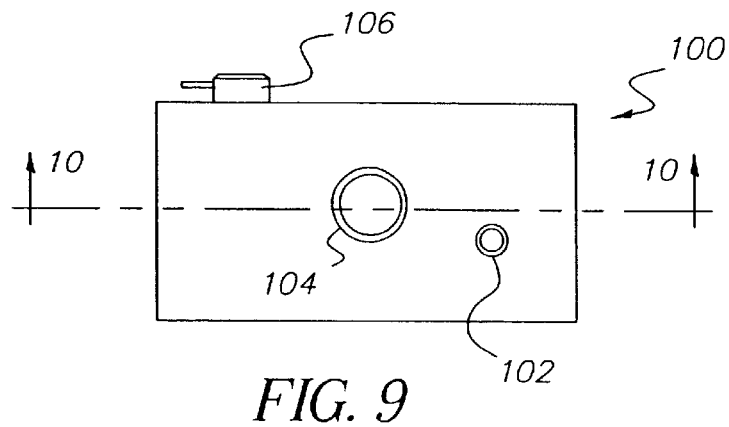
FIG. 9 is a front view of another compact camera and thermal processor of the invention.
Figure 10:
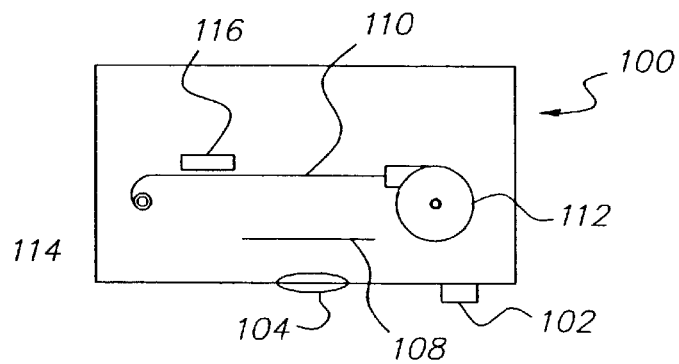
FIG. 10 is a cross-sectional view on line 101—101 of FIG. 9.

FIG. 9 illustrates yet another embodiment of the camera of the invention. Here camera 100 is provided with a shutter release 102, a lens 104 and film advance control 106. The drive control can be manually powered or automatic. With reference to a cross-section view (101—101 of FIG. 9) as shown in FIG. 10, film 110 is supplied in a conventional cartridge 112 with exposed leader and the cartridge and film loaded into the camera 100 through a light-tight aperture (not shown). The film leader is engaged with spindle 114, which is rotated by the film advance control 106. The lens 104 and shutter 108 are located so that the film can be exposed before encountering the heater 116. The camera body additionally contains baffles (not shown) to limit incident light to only the area of the film intended to be exposed while the shutter 108 is open. The film advance control 106 allows the film to be advanced for frame-by-frame exposure and thermal development. The camera also contains a rewinder (not shown for clarity) to rewind film into cartridge 112. Other elements of the camera 100 are as previously shown and are omitted here for clarity.

Figure 11:
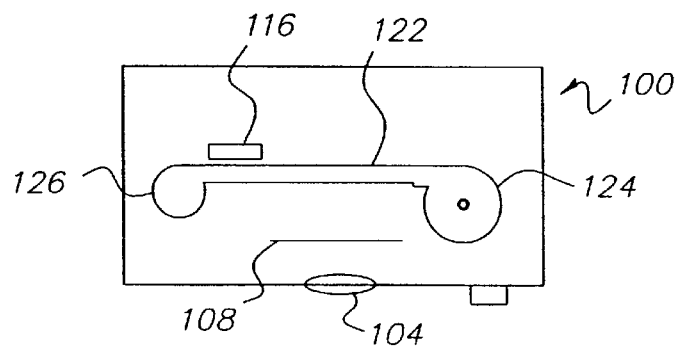
FIG. 11 is a cross-sectional view of an alternae embodiment on line 101—101 of FIG. 9.

Yet another embodiment of the camera is illustrated in FIG. 11 With reference to a cross-section view (101—101 of FIG. 9), film is supplied in a cassette 122 and the cassette loaded into the camera 100 through a light-tight aperture (not shown). The cassette 122 has a film delivery chamber 124 and a film accumulation chamber 126. The cassette is engaged by the film advance control 106. The film advance control 106 allows the film to be advanced from film delivery chamber 124 to film accumulation chamber 126 for frame-by-frame exposure and thermal development. The lens 104 and shutter 108 are located so that the film can be exposed before encountering the heater 116. The camera body additionally contains baffles (not shown) to limit incident light to only the area of the film intended to be exposed while the shutter 108 is open. The camera also contains a rewinder (not shown for clarity) to rewind film within cassette 122. Other elements of the camera 100 are as otherwise described and are omitted here for clarity.

Figure 12:
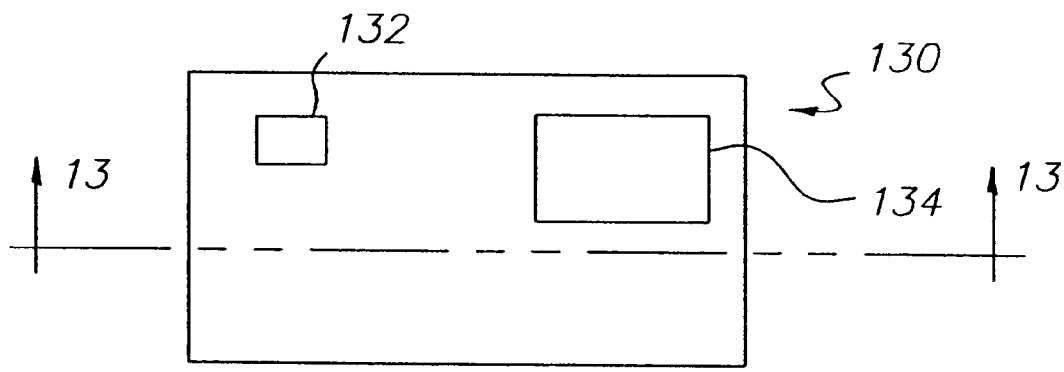
FIG. 12 is a rear view of yet another compact camera and thermal processor of the invention.
Figure 13:
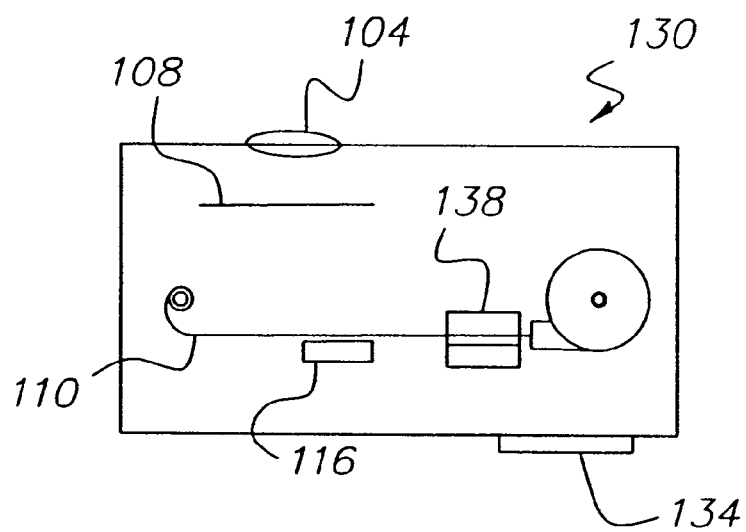
FIG. 13 is a cross-sectional view on line 103—103 of FIG. 12.

In yet another embodiment, shown in FIG. 12. The camera 130 has a viewfinder 132 for use in composing scenes to be recorded and a display 134 for use in verifying the composition of exposed and recorded images. With reference to cross-section 101–103 of FIG. 12 as shown in FIG. 13, film 110 is first exposed by light entering through lens 104 as controlled by shutter 108, then developed by heater 116 and the formed image is optically scanned by scanner 138. The scanned image is then displayed by display 134. Other elements of the camera 100 are as otherwise described and are omitted here for clarity.

The heater 22 utilized in the camera of the invention can be any suitable type of heater. Heaters for the camera include radiant heaters, heated liquid, dielectric, microwave, conduction, and convection. Preferred for the camera of the invention is a resistive heater in the form of a plate, as this provides maximum transfer efficiency for heat to the thermally developable film. Other types of resistive heaters can be utilized such as a series of heater bars or a grid. The resistive heater plate preferred for the invention generally is between about 2 and 5 cm in length. This provides for a reasonable drive speedof the film past the heater plate while allowing an adequate exposure of the film to the temperature of development.

The thrust cartridge can be any cartridge that allows film to be withdrawn from the cartridge and rewound onto the cartridge multiple times while providing light-tight storage, particularly prior to exposure and development. Typical of such cartridges are those utilized in the advanced photo system (APS) for color negative film. These cartridges are disclosed in U.S. Pat. No. 4,834,306—Robertson et al and U.S. Pat. No. 4,832,275—Robertson.

The thermal film utilized in the invention can be any thermal film that provides satisfactory images. Typical films are full color thermal films such as disclosed in U.S. Pat. No. 5,698,365—Taguchi et al. A typical film provides light sensitive silver halides, compounds that form dyes, compounds that release dyes, couplers as dye donating compounds, reducing agents, and binders on supports. A typical film can also contain organic metal salt oxidizing agents and anti-foggants. Other components can be included as known in the photographic and photothermographic art. These components can be added in the same layers or in separate layers over the film base. A wide range of colors can be obtained by using in combination at least three silver halide emulsion layers, each having light sensitivity in different spectral regions. The thermal film can be provided with various supplementary layers such as protective layers, undercoat layers, intermediate layers, anti-halation layers, and back layers. The respective layers can be variously disposed as known in the usual color photographic materials. Filter dyes can be included in some layers.

Light sensitive elements or films useful in the practice of this invention can be supplied in thrust cartridges or cassettes. Thrust cartridges are disclosed by Kataoka et al U.S. Pat. No. 5,226,613; by Zander U.S. Pat. No. 5,200,777; by Dowling et al U.S. Pat. No. 5,031,852; by Pagano et al, U.S. Pat. No. 5,003,334 and by Robertson et al U.S. Pat. No. 4,834,306. These thrust cartridges can be employed in reloadable cameras designed specifically to accept such film cassettes, in cameras fitted with an adapter designed to accept such film cassettes or in one time use cameras designed to accept such cassettes. Narrow-bodied one-time-use cameras suitable for employing thrust cartridges are described by Tobioka et al U.S. Pat. No. 5,692,221. While the film can be mounted in a one-time-use camera in any manner known in the art, it is especially preferred to mount the film in the one-time-use camera such that it is taken up on exposure by a thrust cartridge.

Elements having excellent light sensitivity are best employed in the practice of this invention. The elements should have a sensitivity of at least about ISO 50, preferably have a sensitivity of at least about ISO 200, and more preferably have a sensitivity of at least about ISO 400. Elements having a sensitivity of up to ISO 3200 or even higher are specifically contemplated. The speed, or sensitivity, of a color negative photographic element is inversely related to the exposure required to enable the attainment of a specified density above fog after processing. Photographic speed for a color negative element with a gamma of about 0.65 in each color record has been specifically defined by the American National Standards Institute (ANSI) as ANSI Standard Number PH 2.27—1981 (ISO (ASA Speed)) and relates specifically the average of exposure levels required to produce a density of 0.15 above fog in each of the green light sensitive and least sensitive color recording unit of a color film. This definition conforms to the International Standards Organization (ISO) film speed rating. For the purposes of this disclosure, if the color unit gammas differ from 0.65, the ASA or ISO speed is to be calculated by linearly amplifying or deamplifying the gamma vs. log E (exposure) curve to a value of 0.65 before determining the speed in the otherwise defined manner.

The elements useful in this invention comprise at least one incorporated developing agent, which can be supplied in a blocked or unblocked form as known in the art. When supplied in a blocked form, the blocked developing agent is unblocked on heating as known in the art. Classes of useful developing agents include aminophenols, paraphenylene diamines and hydrazides all as known in the art. Classes of useful blocked developing agents include sulphonamidophenols, carbonamidophenols, carbamylphenols, sulphonamidoanalines, carbonamidoanalines, carbamylanalines, sulphonylhydrazines, carbonylhydrazines, carbamylhydrazines, and such. Multiple distinct developing agents can be employed. On heating the developing agent reacts with incorporated oxidant to form oxidized developer. The oxidized developer then reacts with a color-forming agent to form a dye. The dye can be diffusing or non-diffusing. In one embodiment, the oxidized developer reacts with a chromogenic coupler to form a non-diffusing dye. In another embodiment the oxidized developer reacts with a leuco-dye to form a non-diffusing dye. In yet another embodiment, the oxidized developer reacts with a color-free dye-precursor to liberate a non-diffusing colored dye, all as known in the art. The incorporated oxidant can be any oxidant suitable for reacting with the reduced form of a color-developing agent to form the oxidized form of that color development agent. In one embodiment, the sensitized silver halide can serve as the incorporated oxidant. In another embodiment, a distinct metal salt can serve as the incorporated oxidant. In this latter case, organic silver salts as known in the art are preferred. Silver behenate, silver bezotriazole derivatives, silver acetylide derivatives and silver aminoheterocycle derivatives are specifically preferred classes of incorporated oxidants. The element can also include a pH controlling acid, acid precursor, base or base precursor as known in the art. Further, the element can include an auxiliary developer or electron transfer agent as known in the art. Specific useful species are described by Taguchi et al in U.S. Pat. No. 5,698,365 already cited.

A typical color film construction useful in the practice of the invention is illustrated by the following:
Element SCN-1
SOC Surface Overcoat
BU Blue Recording Layer Unit
IL1 First Interlayer
GU Green Recording Layer Unit
IL2 Second Interlayer
RU Red Recording Layer Unit
AHU Antihalation Layer Unit
S Support
SOC Surface Overcoat The support S can be either reflective or transparent, which is usually preferred. When reflective, the support is white and can take the form of any conventional support currently employed in color print elements. When the support is transparent, it can be colorless or tinted and can take the form of any conventional support currently employed in the photographic arts, e.g., a colorless or tinted transparent film support so long as it otherwise has the strength and thermal stability properties described herein. Details of support construction are well understood in the art. The support is thin enough to enable loading of long lengths in rolled form, while maintaining sufficient strength to resist deformation and tearing during use. The support is generally up to about 180 $\mu$m thick, preferably between 50 and 130 $\mu$m thick, and most preferably between 60 and 110 $\mu$m thick. The support and element flexibility will be such that the element can assume a radius of curvature of less than 12,000 $\mu$m, and preferably less than 6,500 $\mu$m, or even less. Elements useful without cracking or other physical deformity at a radius of curvature of 1,400 $\mu$m or even lower are contemplated. When the element is supplied in cartridge form, the cartridge can enclose a light sensitive photographic element in roll form and a housing for protecting the film element from exposure and an opening for withdrawing the element from the cartridge receptacle. Transparent and reflective support constructions, including subbing layers to enhance adhesion, are disclosed in *Research Disclosure*, Item 38957, cited above, XV. Supports.

Each of blue, green, and red recording layer units BU, GU and RU is formed of one or more hydrophilic colloid layers and contain at least one radiation-sensitive silver halide emulsion and a color forming agent, including at least one dye image-forming agent. In the simplest contemplated construction each of the layer units consists of a single hydrophilic colloid layer containing emulsion and a color-forming agent. When the a color forming agent present in a layer unit is coated in a hydrophilic colloid layer other than an emulsion containing layer, the color forming agent containing hydrophilic colloid layer is positioned to receive oxidized color developing agent from the emulsion during development. Usually the color-forming agent containing layer is the next adjacent hydrophilic colloid layer to the emulsion-containing layer.

In order to ensure excellent image sharpness, and to facilitate manufacture and use in cameras, all of the sensitized layers are preferably positioned on a common face of the support. When in spool form, the element will be spooled such that when unspooled in a camera, exposing light strikes all of the sensitized layers before striking the face of the support carrying these layers. Further, to ensure excellent sharpness of images exposed onto the element, the total thickness of the layer units above the support should be controlled. Generally, the total thickness of the sensitized layers, interlayers and protective layers on the exposure face of the support are less than 35 $\mu$m. It is preferred that the total layer thickness be less than 28 $\mu$m, more preferred that the total layer thickness be less than 22 $\mu$m, and most preferred that the total layer thickness be less than 17 $\mu$m. This constraint on total layer thickness is enabled by controlling the total quantity light sensitive silver halide as described below, and by controlling the total quantity of vehicle and other components, such as a color forming agents, solvent, and such in the layers. The total quantity of vehicle is generally less than 20 $g/m^2$, preferably less than 14 $g/m^2$, and more preferably less than 10 $g/m^2$. Generally, at least 3 $g/m^2$ of vehicle, and preferably at least 5 $g/m^2$ of vehicle is present so as to ensure adhesion of the layers to the support during processing and proper isolation of the layer components. Likewise, the total quantity of other components is generally less than 12 $g/m^2$, preferably less than 8 $g/m^2$, and more preferably less than 5 $g/m^2$.

In another embodiment, the color forming layers can be applied to both sides of a support to form a duplitized film suitable for use in a camera all as described by Szajewski et al U.S. Pat. Nos. 5,744,290 and 5,773,205.

The emulsion in BU is capable of forming a latent image when exposed to blue light. When the emulsion contains high bromide silver halide grains and particularly when minor (0.5 to 20, preferably 1 to 10, mole percent, based on silver) amounts of iodide are also present in the radiation-sensitive grains, the native sensitivity of the grains can be relied upon for absorption of blue light. Preferably the emulsion is spectrally sensitized with one or more blue spectral sensitizing dyes. The emulsions in GU and RU are spectrally sensitized with green and red spectral sensitizing dyes, respectively, in all instances, since silver halide emulsions have no native sensitivity to green and/or red (minus blue) light. Blue-green and green-red sensitive emulsions can also be employed as known in the art. In this context, Blue light is light generally having a wavelength between 400 and 500 nm, Green light is light generally having a wavelength between 500 and 600 nm, and Red light is light generally having a wavelength between 600 and 700 nm.

Any convenient selection from among conventional radiation-sensitive silver halide emulsions can be incorporated within the layer units. Radiation-sensitive silver chloride, silver bromide, silver iodobromide, silver iodochloride, silver chlorobromide, silver bromochloride, silver iodochlorobromide, and silver iodobromochloride grains can be employed. The grains can be either regular or irregular (e.g. tabular). Tabular grain emulsions, those in which tabular grains account for at least 50 (preferably at least 70 and optimally at least 90) percent of total grain projected area are particularly advantageous for increasing speed in relation to granularity. To be considered tabular a grain requires two major parallel faces with a ratio of its equivalent circular diameter (ECD) to its thickness of at least 2. Specifically preferred tabular grain emulsions are those having a tabular grain average aspect ratio of at least 2, preferably greater than 4 and, optimally, greater than 8. Preferred mean tabular grain thicknesses are less than 0.3 $\mu$m (most preferably less than 0.2 $\mu$m). Ultrathin tabular grain emulsions, those with mean tabular grain thicknesses of less than 0.07 $\mu$m, are specifically preferred. The grains preferably form surface latent images so that they produce negative images when processed in a surface developer. While any useful quantity of light sensitive silver, as silver halide, can be employed in the elements useful in this invention, it is preferred that the total quantity be less than 10 g/m$^2$ of silver. Silver quantities of less than 7 g/m$^2$ are preferred, and silver quantities of less than 5 g/m$^2$ are even more preferred. The lower quantities of silver improve the optics of the elements, thus enabling the production of sharper pictures using the elements. These lower quantities of silver are additionally important in that they enable rapid thermal processing of the elements. Conversely, a silver coating coverage of at least 2 g of coated silver per m$^2$ of support surface area in the element is necessary to realize an exposure latitude of at least 2.6 log E while maintaining an adequately low graininess position for pictures intended to be enlarged. The green light recording layer unit is preferred to have a coated silver coverage of at least 0.8 g/m$^2$. It is more preferred that the red and green units together have at least 1.7 g/m$^2$ of coated silver and even more preferred that each of the red, green, and blue color units have at least 0.8 g/m$^2$ of coated silver. For many photographic applications, optimum silver coverages are at least 0.9 g/m$^2$ in the blue recording layer unit and at least 1.5 g/m$^2$ in the green and red recording layer units.

Illustrations of conventional radiation-sensitive silver halide emulsions are provided by *Research Disclosure,* Item 38957, cited above, Section I. Emulsion grains and their preparation. Chemical sensitization of the emulsions, which can take any conventional form, is illustrated in Section IV. Chemical sensitization. Spectral sensitization and sensitizing dyes, which can take any conventional form, are illustrated by Section V. Spectral sensitization and desensitization. The emulsion layers also typically include one or more antifoggants or stabilizers, which can take any conventional form, as illustrated by Section VII. Antifoggants and stabilizers.

BU contains at least one yellow dye image-forming agent, GU contains at least one magenta dye image-forming agent, and RU contains at least one cyan dye image-forming agent. Any convenient combination of conventional dye image-forming agents can be employed. Magenta dye-forming pyrazoloazole agents are particularly contemplated. Conventional dye image-forming agents are illustrated by *Research Disclosure,* Item 38957, cited above, X. Dye image formers and modifiers, B. Image-dye-forming couplers.

The remaining elements SOC, IL1, IL2, and AHU of the element SCN-1 are optional and can take any convenient conventional form.

The interlayers IL1 and IL2 are hydrophilic colloid layers having as their primary function color contamination reduction, i.e., prevention of oxidized developing agent from migrating to an adjacent recording layer unit before reacting with dye-forming agent. The interlayers are in part effective simply by increasing the diffusion path length that oxidized developing agent must travel. To increase the effectiveness of the interlayers to intercept oxidized developing agent, it is conventional practice to incorporate an oxidized developing agent scavenger. When one or more silver halide emulsions in GU and RU are high bromide emulsions and, hence, have significant native sensitivity to blue light, it is preferred to incorporate a yellow filter, such as Carey Lea silver or a yellow decolorizable dye, in IL1. Suitable yellow filter dyes can be selected from among those illustrated by *Research Disclosure,* Item 38957, VIII. Absorbing and scattering materials, B. Absorbing materials. Antistain agents (oxidized developing agent scavengers) can be selected from among those disclosed by *Research Disclosure,* Item 38957, X. Dye image formers and modifiers, D. Hue modifiers/stabilization, paragraph (2).

The antihalation layer unit AHU typically contains a removable or decolorizable light absorbing material, such as one or a combination of pigments and dyes. Suitable materials can be selected from among those disclosed in *Research Disclosure,* Item 38957, VIII. Absorbing materials. A common alternative location for AHU is between the support S and the recording layer unit coated nearest the support.

The surface overcoats SOC are hydrophilic colloid layers that are provided for physical protection of the color negative elements during handling and processing. Each SOC also provides a convenient location for incorporation of addenda that are most effective at or near the surface of the color negative element. In some instances the surface overcoat is divided into a surface layer and an interlayer, the latter functioning as spacer between the addenda in the surface layer and the adjacent recording layer unit. In another common variant form, addenda are distributed between the surface layer and the interlayer, with the latter containing addenda that are compatible with the adjacent recording layer unit. Most typically the SOC contains addenda, such as coating aids, plasticizers and lubricants, antistats and matting agents, such as illustrated by *Research Disclosure,* Item 38957, IX. Coating physical property modifying addenda. The SOC overlying the emulsion layers additionally preferably contains an ultraviolet absorber, such as illustrated by *Research Disclosure,* Item 38957, VI. UV dyes/optical brighteners/luminescent dyes, paragraph (1).

Instead of the layer unit sequence of element SCN-1, alternative layer units sequences can be employed and are particularly attractive for some emulsion choices. Using high chloride emulsions and/or thin (<0.2 μm mean grain thickness) tabular grain emulsions, all possible interchanges of the positions of BU, GU and RU can be undertaken without risk of blue light contamination of the minus blue records, since these emulsions exhibit negligible native sensitivity in the visible spectrum. For the same reason, it is unnecessary to incorporate blue light absorbers in the interlayers.

It is preferred to coat one, two, or three separate emulsion layers within a single dye image forming layer unit so as to obtain the requisite exposure latitude. When two or more emulsion layers are coated in a single layer unit, they are typically chosen to differ in sensitivity. When a more sensitive emulsion is coated over a less sensitive emulsion, a higher speed and longer latitude is realized than when the two emulsions are blended. When a less sensitive emulsion is coated over a more sensitive emulsion, a higher contrast is realized than when the two emulsions are blended. Triple coating, incorporating three separate emulsion layers within a layer unit, is a technique for facilitating extended exposure latitude, as illustrated by Chang et al. U.S. Pat. Nos. 5,314,793 and 5,360,703.

When a layer unit is comprised of two or more emulsion layers, the units can be divided into sub-units, each containing emulsion and a color forming agent, that are interleaved with sub-units of one or both other layer units. The following elements are illustrative:

Element SCN-2
SOC Surface Overcoat
BU Blue Recording Layer Unit
IL1 First Interlayer
FGU Fast Green Recording Layer Sub-Unit
IL2 Second Interlayer
FRU Fast Red Recording Layer Sub-Unit
IL3 Third Interlayer
SGU Slow Green Recording Layer Sub-Unit
IL4 Fourth Interlayer
SRU Slow Red Recording Layer Sub-Unit
S Support
AHU Antihalation Layer Unit
SOC Surface Overcoat Except for the division of the green recording layer unit into fast and slow sub-units FGU and SGU and the red recording layer unit into fast and slow sub-units FRU and SRU, the constructions and construction alternatives are essentially similar to those previously described from element SCN-1. The placement of AHU relative to S and the sensitized layers can vary depending on the decolorizing characteristics of the density forming components incorporated in AHU and on the intended use of the element, all as known in the art. Elements employing multiple AHU layers positioned on both faces of S are specifically contemplated.

Element SCN-3
SOC Surface Overcoat
FBU Fast Blue Recording Layer Unit
IL1 First Interlayer
FGU Fast Green Recording Layer Sub-Unit
IL2 Second Interlayer
FRU Fast Red Recording Layer Sub-Unit
IL3 Third Interlayer
MBU Mid Blue Recording Layer Unit
IL4 Fourth Interlayer
MGU Mid Green Recording Layer Sub-Unit
IL5 Fifth Interlayer
MRU Mid Red Recording Layer Sub-Unit
IL6 Sixth Interlayer
SBU Slow Blue Recording Laycr Sub-Unit
IL7 Seventh Interlayer
SGU Slow Green Recording Layer Sub-Unit
IL8 Eighth Interlayer
SRU Slow Red Recording Layer Sub-Unit
AHU Antihalation Layer Unit
S Support
SOC Surface Overcoat Except for the division of the blue, green, and recording layer units into fast, mid, and slow sub-units, the constructions and construction alternatives are essentially similar to those previously described from element SCN-1.

The following layer order arrangement is also especially useful:

Element SCN-4
SOC Surface Overcoat
FBU Fast Blue Recording Layer Unit
MBU Mid Blue Recording Layer Unit
SBU Slow Blue Recording Layer Sub-Unit
IL1 First Interlayer
FGU Fast Green Recording Layer Sub-Unit
MGU Mid Green Recording Layer Sub-Unit
SGU Slow Green Recording Layer Sub-Unit
IL2 Second Interlayer
FRU Fast Red Recording Layer Sub-Unit
MRU Mid Red Recording Layer Sub-Unit
SRU Slow Red Recording Layer Sub-Unit
IL3 Third Interlayer
AHU Antihalation Layer Unit
S Support
SOC Surface Overcoat Except for the division of the blue, green, and recording layer units into fast, mid, and slow sub-units, the constructions and construction alternatives are essentially similar to those previously described from element SCN-1.

When the emulsion layers within a dye image-forming layer unit differ in speed, it is conventional practice to limit the incorporation of dye image-forming agent in the layer of highest speed to less than a stoichiometric amount, based on silver. The function of the highest speed emulsion layer is to create the portion of the characteristic curve just above the minimum density, i.e., in an exposure region that is below the threshold sensitivity of the remaining emulsion layer or layers in the layer unit. In this way, adding the increased granularity of the highest sensitivity speed emulsion layer to the dye image record produced is minimized without sacrificing imaging speed. Other details of film and camera construction that are especially useful in the present invention are described by Nozawa at U.S. Pat. No. 5,422,231, by Sowinski et al. at U.S. Pat. No. 5,466,560, and by Sowinski et al. at U.S. patent application Ser. No. 09/104,738 filed Jun. 25, 1998.

In the foregoing discussion the blue, green, and red recording layer units are described as containing yellow, magenta, and cyan image dye-forming agents, respectively, as is conventional practice in color negative elements used for printing. In the color negative elements of the invention, which are intended for scanning to produce three separate electronic color records, the actual hue of the image dye produced is of no importance. What is essential is merely that the dye image produced in each of the layer units be differentiable from that produced by each of the remaining layer units. To provide this capability of differentiation, it is contemplated that each of the layer units contains one or more dye image-forming agents chosen to produce image dye having an absorption half-peak bandwidth lying in a different spectral region. It is immaterial whether the blue, green, or red recording layer unit forms a yellow, magenta, or cyan dye having an absorption half peak bandwidth in the blue, green, or red region of the spectrum, as is conventional in a color negative element intended for use in printing, or an absorption half peak bandwidth in any other convenient region of the spectrum, ranging from the near ultraviolet (300–400 nm) through the visible and through the near infrared (700–1200 nm), so long as the absorption half peak bandwidths of the image dye in the layer units extend non-coextensive wavelength ranges. Preferably each image dye exhibits an absorption half-peak bandwidth that extends over at least a 25 (most preferably 50) nm spectral region that is not occupied by an absorption half-peak bandwidth of another image dye. Ideally the image dyes exhibit absorption half-peak bandwidths that are mutually exclusive.

When a layer unit contains two or more emulsion layers differing in speed, it is possible to lower image granularity in the image to be viewed, recreated from an electronic record, by forming in each emulsion layer of the layer unit a dye image which exhibits an absorption half peak bandwidth that lies in a different spectral region than the dye images of the other emulsion layers of the layer unit. This technique is particularly well suited to elements in which the layer units are divided into sub-units that differ in speed. This allows multiple electronic records to be created for each layer unit, corresponding to the differing dye images formed by the emulsion layers of the same spectral sensitivity. The digital record formed by scanning the dye image formed by an emulsion layer of the highest speed is used to recreate the portion of the dye image to be viewed lying just above minimum density. At higher exposure levels second and, optionally, third electronic records can be formed by scanning spectrally differentiated dye images formed by the remaining emulsion layer or layers. These digital records contain less noise (lower granularity) and can be used in recreating the image to be viewed over exposure ranges above the threshold exposure level of the slower emulsion layers. This technique for lowering granularity is disclosed in greater detail by Sutton U.S. Pat. Nos. 5,314,794 and 5,389,506.

Each layer unit of the color negative elements of the invention produces typically a dye image characteristic curve gamma of less than 1.5, which facilitates obtaining a useful exposure latitude for recording scenes. A minimum exposure latitude for recording scenes is about 1.8 log E. A first acceptable exposure latitude for a pictorial multicolor photographic element is that which allows accurately recording the most extreme whites (e.g., a bride's wedding gown) and the most extreme blacks (e.g., a bridegroom's tuxedo) that are likely to arise in photographic use. An exposure latitude of 2.6 log E can just accommodate the typical bride and groom wedding scene. Accordingly, the elements useful in the practice of this invention exhibit an exposure latitude of at least 1.8 log E. An exposure latitude of at least 2.6 log E is preferred, while an exposure latitude of at least 3.0 log E is more preferred since this allows for a comfortable margin of error in exposure level selection by a photographer. Even larger exposure latitudes of 3.6 log E are especially preferred for photothermographic elements, since the ability to obtain accurate image reproduction with rudimentary exposure control is realized. Whereas in color negative elements intended for printing, the visual attractiveness of the printed scene is often lost when gamma is exceptionally low, when color elements are scanned to create electronic image-bearing signals from the dye image records, contrast can be increased by adjustment of the electronic signal information. When the elements of the invention are scanned using a reflected beam, the beam travels through the layer units twice. This effectively doubles gamma ($\Delta D/\Delta \log E$) by doubling changes in density $\Delta D$). Since density formation range and gamma together effectively define latitude, lower gammas can facilitate obtaining longer latitude, especially in films with limited density formation capability. Thus, gammas as low as 0.65, 0.5, 0.35 or even 0.2 or lower are contemplated and exposure latitudes of up to about 5.0 log E or higher are contemplated.

It is appreciated that while the element has been described in detail as a color negative element, similar considerations apply to positive working elements so long as they fulfill the latitude, gamma, and color-forming requirements already described. In a concrete example, the element can be made positive working by employing direct reversal emulsions as known in the art.

A suitable thermal film renders an image in response to an imagewise exposure to light upon thermal development. Typical thermal processing conditions involve development temperatures of about 50 to 180° C. for a period of 0.1 to 60 seconds. The film base can be any suitable kind of film base that does not substantially decompose under the processing conditions. Polyelhyleneterephthalate (PET), polyethylenenapthalate (PEN), and annealed PEN (APEN) are examples of suitable materials for the film base. The lens for the camera of the invention can be any suitable lens or lens combination capable of forming an adequately sharp image of the scene at an image plane coincident with the plane of the unexposed thermal film. Ground and polished glass and shaped clear plastic lenses are typical of suitable lens types. The lens can be treated with an anti-reflection coating to enhance light transmittance through the film while reducing unwanted reflectance from the lens surface. The lens can be a removable and interchangeable lens mounted to the camera using a screw mount, a bayonet mount, or other mount as know in the art. Alternatively, a permanently mounted lens can be employed. Generally, for pictorial applications, a focal length matching to within 25% the diagonal of the rectangular film exposure area is preferred. Thus when a hand-held camera intended for pictorial applications has a premounted lens, the lens will have a focal length between about 10 and 100 mm, and a lens aperture between f/2 and f/32. The focal length is preferably between about 15 and 60 mm and most preferably between about 20 and 40 mm. Lens apertures of between f/2.8 and f/22 are contemplated with a lens aperture of about f/4 to f/16 being preferred. The lens MTF can be as low as 0.6 or less at a spatial frequency of 20 lines per millimeter (lpm) at the film plane, although values as high as 0.7 or most preferably 0.8 or more are contemplated. Higher lens MTF values generally allow sharper pictures to be produced. Multiple lens arrangements comprising two, three, or more component lens elements consistent with the functions described above are specifically contemplated.

While any film area can be exposed using a camera of the invention, a hand-held camera typically enables exposure of image areas on the film of less than about 10 $cm^2$. Even smaller exposure areas can be employed with values of less than 9, 8, or 7 cm² being preferred. Especially preferred are exposure areas of 5 cm² or less. These exposed areas will typically have an image aspect ratio of between 1:1 and 4:1. Classic aspect ratios of about 1.4:1 and 1.5:1 are preferred as are High Definition Television aspect ratios of about 1.8:1 and Panoramic aspect ratios of about 2.8:1. The camera provides means for exposing more than one scene per unit of film, with arrangements enabling the exposure of 6, 10, 12, 24, 27, 36 or even more distinct scenes being especially preferred. The camera can be arranged to provide the user with mixed aspect ratio scene images on the same roll.

The shutter for the camera can be any suitable type of device capable of metering the exposure of the thermal film by controlling the time duration that the shutter remains open to allow light into the light-tight enclosure. Typical of suitable shutter devices are shutter devices that are actuated by a mechanical means controlled by a pressure sensitive switch mounted external to the light-tight enclosure. Newer digital shutters are specifically contemplated. Preferred for the camera of the invention are shutters that provide optimal exposure to the thermal film and avoid under or over exposing the thermal film. When the camera is intended to be a hand-held camera, the shutter employed with the camera allows an exposure time of less than about 1/60 second so as to minimize sharpness losses due to shake inherent with hand-held cameras. Shutter times of less than 1/100 sec are preferred, while even shorter shutter times are even more preferred. The aperture for the camera of the invention can be any suitable sort of device capable of metering the exposure of the thermal film by regulating the area through which light penetrates the light-tight enclosure when the shutter is open. Preferred for the camera of the invention are aperture devices that provide for optimal exposure of the thermal film and avoid under or over exposing the thermal film. The shutter and the aperture devices can be separate or they can be combined in a single device. Preferred for the camera of the invention are combined shutter and aperture devices that provide optimal exposure of the thermal film by regulating the exposure time and aperture in response to the scene brightness and film type. Exposure control systems are disclosed in U.S. Pat. No. 5,382,997—Sato et al and U.S. Pat. No. 4,792,820—Norita et al.

The flash in the camera of the invention can be any suitable sort of device capable of providing additional scene illumination. Preferred for the camera of the invention are electronic flash devices that provide sufficient additional illumination to provide for optimal exposure of the thermal film in response to scene brightness and film type. Flash devices are disclosed in U.S. Pat. No 4,331,400—Brownstein et al and U.S. Pat. No. 4,727,389—Raschke. Further preferred for the camera of the invention are flash devices that reduce unwanted effects such as red eye. Means to reduce red-eye effects are disclosed in U.S. Pat. No. 5,720,038—Fukuhara et al and U.S. Pat. No. 4,285,588—Mir. The viewfinder for the camera of the invention can be any suitable sort of device capable of adequately relating the scene frame to be captured on the unexposed thermal film prior to exposure as known in the art. The camera of the invention can also be provided with a means to control the format (i.e. panoramic, HDTV, or normal) of the imaged scene. Such a format control mechanism can be any suitable type of mechanism capable of altering the format of the exposure by altering the aperture or capable of controlling the format of the print resulting from subsequent processing. Format control means are disclosed in U.S. Pat. No. 5,583,591—Saito et al.

The thermal film advancement mechanism for the camera of the invention can be any suitable type of mechanism as known in the art capable of positioning the unexposed thermal film to adequately capture the desired scene when the shutter is activated. Preferred for the camera of the invention are film advancement mechanisms that maintain the film in the image plane defined by the lens for sharpness and film advancement mechanisms that efficiently utilize the unexposed regions of the thermal film while avoiding unwanted double exposure. The film advancement mechanism typically utilizes sensors to determine the film position and to aid in frame-by-frame advancement. Film advancement means are disclosed in U.S. Pat. No. 4,479,705—Tamamura et al and U.S. Pat. No. 5,583,591—Saito et al. An alternative embodiment of the camera of the invention includes and autofocus means. The advantages of an autofocus means are widely appreciated and the autofocus means for the camera of the invention can be any suitable sort. Autofocus means are disclosed in U.S. Pat. No. 5,406,348—Wheeler, U.S. Pat. No. 4,710,013—Wong, and U.S. Pat. No. 4,860,045—Hamada et al.

The camera can provide a means to record information at the time of exposure. A preferred embodiment of the camera provides a means to record magnetic or optical information at the time of exposure. Information such as exposure conditions and flash status are typical of information that can be recorded at the time of exposure. This information can be recorded and later retrieved to modify subsequent thermal or digital processing to achieve optimal photographic results. The camera of the invention can also be provided with a means to retrieve previously recorded information prior to exposure to modify the exposure conditions. For example, film type parameters can be accessed prior to exposure and used to modify exposure conditions to achieve optimal photographic results.

The accumulator for the film in the camera of the invention can be any suitable kind of device. Generally, it is preferred that the drive means for the accumulator also drives the cartridge to thrust the film from the cartridge and rewind it into the cartridge. However, separate drive means to thrust the film in and out of the cartridge and to drive the accumulator can also be provided. For compact design, it has been found that having the drive motor within the accumulator itself provides efficiency and compactness. While this is a preferred embodiment, it is not necessary to adequate function of the apparatus, and the drive motor or drive motors can be placed in any position suitable for actuating the thrust cartridge and accumulator to effect transport of the film. The drive motor can be any suitable type of drive motor. Drive motors include AC, DC, and stepper electric motors. Preferred for the camera of the invention is a DC electric motor, as this provides a simple means of controlling drive speed. While DC electric motors are preferred in some embodiments, other types of motors or combinations of motors can be used to effect suitable means of driving the film.

The camera is provided with means for controlling the speed of the film over the heater. It is also provided with means for determining and controlling the temperature of the heater. It is important for the best photographic performance that the heater be accurately controlled for optimum development temperature. The drive speed, in combination with the heater temperature, provides accurate control of the development process. The heater will be provided with a temperature sensor to determine the instantaneous temperature of the heater. The temperature sensor can be a thermocouple or any other suitable device. Power is supplied to the heater in proportion to a temperature deficiency detected by the temperature sensor. The temperature control circuit uses feedback to maintain and control the temperature of the heater and thereby control the development temperature. The speed of the film over the heater can be controlled by any suitable means of speed control. Pulse width modulation applied to a DC motor that drives both the thrust cartridge and accumulator or timed steps applied to a stepper motor that drives both the thrust cartridge and accumulator are examples of suitable speed control. The motor that drives both the thrust cartridge and the accumulator can be placed within the accumulator for compactness. While this is a preferred embodiment, the drive means can comprise one motor or any combination of motors located in suitable positions within the camera of the invention. The film speed is controlled to provide sufficient residence time for the film near the heater and to provide optimal development. The camera of the invention typically requires an exposure to the heater for about 2 to 30 seconds to develop a frame of film.

It may be desirable to provide a means to prevent contact of the film with the heater at certain times. For instance, if the device is stopped while film is on the heater, the film could be damaged or improperly developed. To prevent this, the heater could be removed from the film path or the device could be provided with a means to change the film path to be away from the heater. A method for removing the heater from the film path uses an armature connected to a series of gears that are driven by a motor. The motor is controlled to drive the heater away or toward the film path as desired. The motor can be any suitable type of drive motor. Preferred motor for the camera of the invention is a stepper electric motor, as this provides a simple means to control the motion of the heater. For compact design, it has been found that having the motor actuating the heater within the accumulator provides efficiency and compactness. While this is a preferred embodiment, it is not necessary for adequate function of the camera, and the motor actuating the heater can be placed in any position suitable for moving the heater in close proximity to and removing the heater from the film path.

The motor actuating the heater can be controlled by preset conditions, or it can be constructed to respond to signals provided by sensors monitoring the film and/or development. Sensors can be mounted in the film path to monitor a plurality of parameters including film speed, film location, temperature, frame advancement, and fault conditions such as film breakage, film jam, and heater malfunction. Light emitting diode (LED) sensors are preferred for detection of the position of the image frames in the thermal film. While LED sensors are preferred for the detection of image frame position, the sensors utilized in the camera of the invention can be of any suitable type to monitor the parameters of interest. Sensors for the camera include optical, magnetic, mechanical, and electronic sensors. The response of such sensors is transmitted to the drive mechanism actuating the heater to place the heater in close proximity to or remove the heater from the film path as desired. In another embodiment, actuated guide rollers are used to lift the film away from the heater when contact between the film and the heater is not desired. The film can also be protected from undue heating by a heater that is sufficiently low in thermal mass and fast in response time to allow the temperature of the heater to be reduced below the damage threshold of the film when necessary.

The optical writer can be any suitable type of optical writer. Optical writers that provide spatially resolved calibrated exposures are preferred as they provide a means to write information, graphics, and sensitometric tables. The light source for the optical writer can be any suitable light source. Fluorescent lamps, incandescent lamps, and light emitting diodes (LEDs) are examples of suitable types of light sources. Preferred for the camera of the invention are LEDs, as LEDs comprise light sources that are efficient and compact. The light source can be a single unit or comprise many individual light emitting elements. A linear array of individually addressed light emitting diodes is an example of a suitable light source comprised of many individual light emitting elements. The light source can comprise elements capable of emitting light over particular spectral bands. Full color optical writing results from exposing film to a combination of light sources comprising three suitable spectral bands. Preferred for the camera of the invention are individually addressed tri-linear LED light sources as individually addressed tri-linear LED light sources comprise spatially resolved light emitting elements that can be constructed to emit light over particular spectral bands in an efficient and compact manner. While individually addressed tri-linear array light sources are a preferred embodiment, any suitable light source can be used for the optical writer. A preferred embodiment of the camera of the invention utilizes a tri-linear LED array as the light source for both optical writer and optical image scanner for compactness. The light source for the optical writer can be located anywhere in the film path on either the emulsion side of the film or the film base side of the film.

The camera of the invention can be provided with a means to control the light source for said optical writer. The camera of the invention can further be provided with a means to pulse the output of the light source for said optical writer to provide for exposure control. Exposure control can be effected by applying a known number of pulses of known duration to light emitting elements of the light source for said optical writer. The camera of the invention can also be provided with a means to spatially resolve optical writing by pulsing individual elements of the light source as the film travels between said thrust cartridge and said accumulator. A preferred embodiment of the invention comprises a three-color individually addressed tri-linear LED array light source that spans the film path to effect full color optical writing on either exposed or unexposed regions of said thermal film by pulsing individual LED elements as said thermal film passes between thrust cartridge and accumulator. The optical writer can write any sort of optical information. Typical sorts of optical information include alpha-numerics such as text or time/date stamp, graphics, sensitometric tables and/or color patches or any other type of information that can be encoded optically on either previously exposed or unexposed regions of said thermal film.

The optical writer can be provided with controls to write optical information in different regions of the thermal film. For example, the optical writer can be controlled to write sensitometric tables between exposed but undeveloped region of the thermal film or the optical writer can be controlled to write a time/date stamp in a fixed location on a series of image frames. The camera of the invention can be used to write optical information on film that is not intended to be imagewise exposed to an external scene. The film contained in the thrust cartridge would then serve as a mass storage device for any type of information that can be encoded optically. Another embodiment for the camera of the invention provides a means to write optical information onto the film that is not readily apparent to the casual observer but that can be detected using appropriate instrumentation and/or analysis.

The optical detector for the optical writer can be any suitable type of device capable of faithfully detecting levels of incident radiation. Solid-state detectors such as charge coupled devices (CCDs) or complementary metal oxide semiconductor (CMOS) devices are preferred as they provide a means to faithfully record levels of incident radiation in a package that is compact and low in power requirements. A preferred embodiment of the camera of the invention comprises an optical detector for the optical writer that can detect incident radiation in particular spectral regions to provide for full color calibration of the light source for the optical writer. The camera of the invention can be provided with controls to control the output of the light source of the optical writer to provide a known exposure in response to incident radiation levels sensed by the optical detector of said optical writer. The camera of the invention can also be provided with a plurality of optical detective elements to simultaneously calibrate a light source that comprises spatially resolved individually addressed light emitting elements. A preferred embodiment of the invention utilizes a three-color tri-linear CCD array as an optical detector for both the optical writer and the optical scanner for efficiency and compactness. The optical detector of the optical writer can be located anywhere in the film path and can be located on either the emulsion side or the film base side of the film.

The camera of the invention includes a means for optical scanning. The optical scanner provides an electronic representation of film image information or other information optically encoded on the film. The utility of such an electronic record is widely known in the art. For example, the electronic record of the film image information can be digitized and further processed using various algorithms and communicated to a printing device to yield high quality output prints without requiring optical printing. Typical application of the optical scanner involves scanning thermally processed regions of said thermal film. However, optical scanning can be performed either before or after thermal film has been entirely thermally processed. For example, a test patch of film can be thermally processed and optically scanned and the resulting optical density information can be used to modify subsequent processing conditions. If optical scanning is performed while regions of the film remain unprocessed, care must be taken to ensure that the light source of said scanner does not further expose unprocessed regions of the thermal film. After thermal processing and optical scanning, the film can be rewound back into the thrust cartridge for convenient storage.

The optical scanner can be any suitable type of optical scanner. Preferred for the camera of the invention are scanners that faithfully create an electronic record of the film image information. Typical of suitable optical scanners are optical scanners such as disclosed in U.S. Patent No. 5,684,610—Brandestini et al. Optical transmission scanners are preferred as they provide high spatial resolution scanning with sufficient detection fidelity. The camera of the invention can be provided with a means to process, modify, store, and retrieve the electronic record of the film image data produced by the optical scanner. A preferred embodiment of the system of the invention comprises using scanned data from sensitometric tables and/or color patches written onto the film by the optical writer to modify and control subsequent processing such as thermal development of undeveloped region of the film and optical scanning of other film image data to enhance imaging system performance. The camera of the invention can further comprise means to process the electronic record of film image data in response to information provided by sensitometric tables and/or color patches written by the optical writer. The camera of the invention can also be provided with a means to process, store, and retrieve the electronic record of the optical scanning parameters associated with the optical scanning of the film. The camera of the invention can be provided with a means to communicate the electronic record of the film image data and/or scanning parameters to other hardware devices including displays, computer systems, and printers and to other electronic communication networks. Optical information can also be recorded on the thermally developable film to be read by the optical scanner and used to control thermal processing conditions or magnetic reading or magnetic writing.

The light source for the optical scanner can be any suitable type. Light sources include incandescent bulbs, fluorescent lamps, and light emitting diodes (LEDs). Preferred for the camera of the invention are LED light sources as LED light sources are efficient and compact. In one embodiment of the invention three distinct LED sources, each one emitting different wavelengths, are utilized as the light source. For example, blue, green, and red emitting LEDs can be combined to produce effectively white light to be used as the illuminant. While this is a particular embodiment, other suitable light sources can be used to effect faithful scanning of the film image information. The light source is provided with controls so that it can be activated and deactivated as appropriate to perform effective optical scanning without interfering with other functions of the invention.

A mirror or mirror system can be provided as part of the optical scanner to redirect the transmitted light. A preferred embodiment of the invention provides a mirror to direct the transmitted light beam to be roughly parallel to the film path for efficiency and compactness. Any suitable and appropriately reflective device can serve as a mirror. Silver coated polished aluminum mirrors are preferred for the camera of the invention as silver coated polished aluminum mirrors are robust, low-cost, and appropriately reflective. While silver coated polished aluminum mirrors represent a preferred embodiment, any suitably reflective surface can be used as a mirror in the camera of the invention. The mirror can be planar or curved. A non-planar mirror can be used to focus or otherwise modify the beam of transmitted light to improve scanner system performance.

The camera of the invention can be provided with a lens or lens system to modify the transmitted light beam. The lens or lens system can be comprised of spherical or non-spherical lenses. Spectral filters can be provided in the light path to modify the spectral distribution of the incident or transmitted light beam. One embodiment of the invention incorporates liquid-crystal light modulators and/or spectral filters that can be electronically activated and/or mechanically actuated to modify and control the intensity and spectral distribution of the incident and transmitted light. An advantage of this embodiment is that it does not require a color sensitive photoelectronic detector. While this represents one embodiment, the camera of the invention does not require liquid-crystal light modulators or mechanically actuated spectral filters. To enhance fidelity and increase efficiency, all optical interfaces can be anti-reflection coated as is known in the art.

The photosensitive detector can be any suitable type of device capable of faithfully producing an electronic signal in response to incident light. Solid-state detectors and photomultiplier tubes are examples of suitable photosensitive elements. Preferred for the camera of the invention are solid state detectors. Charge coupled devices (CCD) or complementary metal oxide semiconductors (CMOS) are particular examples of suitable solid-state photoelectronic detectors. The detectors can be combined in a linear array so that stripes of the film corresponding to the length of the linear array are scanned simultaneously. One embodiment of the invention utilizes a tri-linear array of photosensitive cells where each linear array is sensitive to incident radiation of a different spectral distribution. For example if a white light source is used, the transmitted light intensity data from red, green, and blue sensitive linear photodetector arrays can be processed to yield a full color electronic file representation of the film image information. While tri-linear array detectors are preferred, other suitable types of detectors can be used. For example, two-dimensional array detectors can be utilized to simultaneously scan larger areas of the film than tri-linear arrays. This would allow faster film feed rates and provide for more rapid scanning. Large two-dimensional array detectors can be used to simultaneously scan an entire film image frame.

The camera can be provided with controls for the optical scanner. The capability to perform optical scanning in response to information stored electronically, magnetically, or optically on the thermally developable film or the thrust cartridge or information provided by some other source is important to achieve optimal optical scanning. Parameters such as desired resolution, film type, and expected optical density range can be communicated to the optical scanner so that the scanning parameters can be altered to produce advantaged optical scans and prevent interference between optical scanning and other functions of the invention such as thermal processing or magnetic information reading or writing. The magnetic reader can be any suitable type of magnetic reader. Preferred for the camera of the invention are inductive type laminated mu-metal core with a coil magnetic readers as such magnetic readers provide a low-cost and robust means to read magnetic information stored on film while minimizing noise and controlling cross-talk. The magnetic reader can be located anywhere in the film path. Locating the magnetic reader so that the magnetic information is read before the film is thermally processed is preferred as this allows the processing conditions to be controlled in response to the magnetic information and avoids potential degradation of the magnetic information associated with the thermal processing. Multiple magnetic readers can be included so that magnetic information is read at a variety of locations in the film path. The camera of the invention also contains means to store, transmit, and record electronic information. Specifically the camera of the invention contains means to store, transmit, and process the electronic record of the magnetic information sensed by the magnetic reader. This electronic record can be used to control or modify subsequent processes such as thermal processing, optical printing, or optical scanning. The capability to perform subsequent processing in response to information stored magnetically on the film is important to optimal imaging system performance. For example, since different thermal film formulations generally require different thermal processing conditions to achieve optimal development, controlling the heater and film drive speed in response to film type information that can be stored magnetically on the film is important to achieve optimal development and subsequent image quality.

The magnetic writer can be any suitable type of magnetic writer. Preferred for the camera of the invention are inductive type laminated mu-metal core with a coil magnetic writers as such magnetic writers provide a low-cost and robust means to write magnetic information onto film. The magnetic writer can be located anywhere in the film path. Locating the magnetic writer so that the magnetic information is written after the film is thermally processed is preferred as this avoids potential degradation of the magnetic information associated with the thermal processing. Multiple magnetic writers can be included so that magnetic information is written at a variety of locations in the film path. The magnetic writer can write any type of information that can be encoded magnetically. Specifically the magnetic writer can rewrite data previously stored on the film or film cartridge or the magnetic writer can write new information onto the film such as the processing conditions or the date of processing. Such information is used to optimize subsequent processing. For example, advantaged optical scanning results from adjusting optical scanning parameters to provide for expected density values based on the processing conditions.

A preferred embodiment of the camera of the invention requires magnetic information to be written onto the film in positions that are known relative to other elements on the film such as imaging frames. A preferred means of determining the image frame position comprises light emitting diode (LED) sensors and perforations in the film spaced at regular intervals relative to the imaging frames. Writing the magnetic information onto regions of the film in registry with the imaging frames allows frame specific information to be more accurately and immediately applied to individual frames resulting in improved system efficiency.

The magnetic writer can be combined with the magnetic reader into a single assembly or they can be separate. The magnetic reader and the magnetic writer can be mounted together or separately on one or more armatures which can be actuated to remove the magnetic reader or the magnetic writer from the film path. The motor actuating an armature can be controlled by preset conditions, or it can be constructed to respond to signals provided by sensors monitoring the film and/or development. Sensors can be mounted in the film path to monitor a plurality of parameters including film speed, film location, temperature, frame advancement, and fault conditions such as film breakage, film jam, and heater malfunction. The armature mechanism can be constructed so that the magnetic reader and the magnetic writer are actuated simultaneously or independently. Retraction of the magnetic reader and/or the magnetic writer is of utility to avoid unwanted interference with other processing steps such as thermal development or optical scanning. Specifically, contact between the magnetic reader and/or the magnetic writer and the thermal film can prevent the film from optimally engaging the heater or optical scanner. Removing the magnetic reader and/or the magnetic writer from the film path avoids such detrimental interference. The armature mechanism can be constructed to return the magnetic reader or magnetic writer to the film path after the magnetic reader or magnetic writer has been removed from the film path.

The camera of the invention can be provided with a means to erase any magnetic information stored on the film. The device used to erase the magnetic information can be any suitable type of device. The magnetic eraser can be located anywhere in the film path. Locating the magnetic eraser so that the magnetic information is erased after the film is thermally processed but before magnetic information is rewritten onto the film is preferred, as this allows potentially degraded magnetic information to be discarded and further allows for more effective writing of magnetic information by the magnetic writer. The magnetic eraser can also allow the magnetic writer to write magnetic information in a more efficient or useful format than originally present on the film.

The camera of the invention can be provided with a means to preserve the magnetic information through the thermal processing conditions. The magnetic information can be preserved through the thermal processing conditions by insulating regions of the film containing the magnetic information from the temperature extremes of the thermal process. This can be accomplished by providing power to the heater only when the regions of the film containing magnetic information are in positions so as not to be overly subject to the temperature extremes of thermal development. Magnetic information stored on the film can also be substantially preserved if the regions of the film containing magnetic information are cooled while other regions of the film are exposed to thermal development. The device used to cool the magnetic regions of the film can be any suitable type of device. Preferred for the camera of the invention are thermoelectric coolers as thermoelectric coolers provide for compact and localized cooling without requiring a working fluid or compressor.

The leader for the thermal film should maintain its dimensional stability during processing of the film. The film may misfeed or jam in the film path if the leader exhibits excessive curl, warp, or twist, or expands or contracts excessively under the conditions of the thermal processing. The leader is critical to the repeated use of the developed film in the thrust cartridge. A degraded or unsuitable leader prevents the film from smoothly traversing the film path and results in excessive wear of the film including scratching of the image elements. Repeated use of a thrust cartridge containing film with an unsuitable leader will also cause the thrust cartridge to fail so that the film can no longer be thrust from or rewound into the thrust cartridge. To avoid these problems, the leader can either be protected from the heat extremes of development or be formed of a material that is dimensionally stable at the temperatures of development of up to 180° C. The leader is protected from the heat extremes of development by removing the heater element from the film path until the leader has passed and is no longer in close proximity to the heater. The heater is then placed back into the film path as necessary to process the imaging frames. Suitable actuation of the heater can be provided by a variety of electromotive sub assemblies. In another embodiment, power is supplied to the heater only if the leader is not in close proximity to the heater, thereby insulating the leader from the heat extremes of thermal development. Insulating the leader from the heating element is not required if the leader is comprised of a material that maintains sufficient dimensional stability through the process conditions. To prevent unwanted distortion of the image, the film base need also remain stable through the processing conditions. The typical developing temperatures for color thermal film are likely to be between 50 and 180° C. Therefore, any suitable material that maintains sufficient dimensional stability through these process conditions could be used as the leader or film base material. Polyethyleneterephthalate (PET) is found to be sufficiently stable to be used as a leader and film base, provided the exposure to the highest temperature processing conditions is not excessive.

The camera can be of any size that is adequate to accommodate the lens, shutter, cartridge, heater, power-supply and drive mechanisms. It is preferred that the camera be made as compact as possible. The batteries for the camera can be any suitable batteries capable of supplying adequate power to the device. Batteries with high power density and long life are preferred for the camera since such batteries allow enhanced compactness and efficiency. An alternative embodiment of the camera provides an electrical connection to an external power and/or control device. The electrical connection can be any suitable type capable of transmitting electrical power and/or control signals to the camera of the invention. Such an embodiment can provide more power to the device than easily supplied by batteries and increased compactness can be achieved by decreased dependence on battery power. The camera can be provided with a means to be plugged into a standard electrical outlet. Alternatively, the camera can be employed as a computer peripheral device. The computer can be a general purpose computer or it can be a dedicated processor and control device. When the camera is employed in this mode it can draw power from the computer. In another embodiment, power may be supplied from an external battery pack or other power source such as a vehicle battery. The camera of the invention does not require many of the resources necessary to traditional wet-process photofinishing. It, therefore, allows more convenient photofinishing than traditional wet-processes. It is contemplated that the camera will find application in more widely dispersed settings, such as home or small office use, than traditional wet-process photofinishing. It is further contemplated that the device of the invention will allow photofinishing in remote locations lacking resources, such as contaminant free water and means to treat contaminated effluent, necessary for traditional wet processing. It is further contemplated that the camera of the invention will allow scanned captured scenes to be displayed to allow the operator to check image composition and exposure.

The following examples illustrate the practice of this invention. They are not intended to be exhaustive of all possible variations of the invention. Parts and percentages are by weight unless otherwise indicated.

EXAMPLES

Example 1

A full color heat developable film is prepared.
Light-Sensitive Silver Halide Emulsion (1) [for Red Sensitive Emulsion Layer]

Solution (1) and solution (2) shown in Table 1 are concurrently added to a well-stirred aqueous solution of gelatin (a solution of 16 g of gelatin, 0.24 g of potassium bromide, 1.6 g of sodium chloride, and 24 mg of compound (a) in 540 ml of water heated at 55° C.) at the same flow rate for 19 minutes. After 5 minutes, solution (3) and solution (4) shown in Table 1 are further concurrently added thereto at the same flow rate for 24 minutes. After washing and salt removal by a conventional method, 17.6 g of lime-treated ossein gelatin and 56 mg of compound (b) are added to adjust the pH and the pAg to 6.2 and 7.7, respectively. Then, 1.02 mg of trimethylthiourea are added, followed by optimum chemical sensitization at 60° C. Thereafter, 0.18 g of 4-hydroxy-6-methyl-3,3a,7-tetraazainedene, 64 mg of sensitizing dye (C) and 0.41 g of potassium bromide are in turn added, followed by cooling. Thus, 590 g of a monodisperse cubic silver chlorobromide emulsion having a mean grain size of 0.30 $\mu$m is obtained.

TABLE 1

|  | Solution (1) | Solution (2) | Solution (3) | Solution (4) |
|---|---|---|---|---|
| $AgNO_3$ | 24.0 g | — | 56.0 g | — |
| $NH_4NO_3$ | 50.0 mg | — | 50.0 mg | — |
| KBr | — | 10.9 g | — | 35.3 g |
| NaCl | — | 2.88 g | — | 1.92 g |
| $K_2IrCl_6$ | — | 0.07 mg | — | — |
| Amount Completed | Water to make 130 ml | Water to make 200 ml | Water to make 130 ml | Water to make 200 ml |

Compound (a)

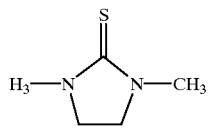

Compound (b)

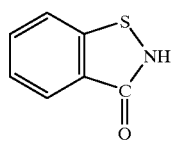

Dye (C)

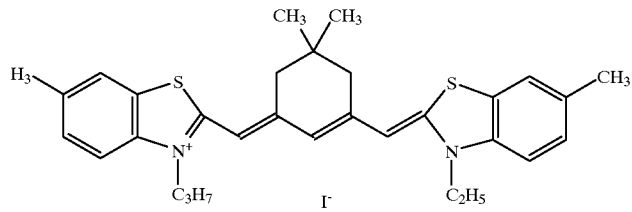

Light-Sensitive Silver Halide Emulsion (2) (for Green Sensitive Emulsion Layer)

Solution (1) and solution (2) shown in Table 2 are concurrently added to a well-stirred aqueous solution of 5% gelatin (a solution of 20 g of gelatin, 0.30 g of potassium bromide, 2.0 g of sodium chloride, and 30 mg of compound (a) in 600 ml of water heated at 46° C.) at the same flow rate for 10 minutes. After 5 minutes, solution (3) and solution (4) shown in Table 2 are further concurrently added thereto at the same flow rate for 30 minutes. One minute after termination of addition of solutions (3) and (4), 600 ml of a solution of sensitizing dyes in methanol containing 360 mg of sensitizing dye ($d_1$) and 73.4 mg of sensitizing dye ($d_2$) is added. After washing and salt removal (conducted using sedimenting agent (e) at pH 4.0) by a conventional method, 22 g of lime-treated ossein gelatin is added to adjust the pH and pAg to 6.0 and 7.6, respectively. Then 1.8 mg of sodium thiosulfate and 180 mg of 4-hydroxy-6-methyl-1,3,3a,7-tetraazainedene are added, followed by optimum chemical sensitization at 60° C. Thereafter, 90 mg of antifoggant (f) and 70 mg of compound (b) and 3 ml of compound (g) as preservatives are added, followed by cooling. Thus, 635 g of a monodisperse cubic silver chlorobromide emulsion having a mean grain size of 0.30 μm is obtained.

TABLE 2

|  | Solution (1) | Solution (2) | Solution (3) | Solution (4) |
|---|---|---|---|---|
| $AgNO_3$ | 10.0 g | — | 90.0 g | — |
| $NH_4NO_3$ | 60.0 mg | — | 380 mg | — |
| KBr | — | 3.50 g | — | 57.1 g |
| NaCl | — | 1.72 g | — | 3.13 g |
| $K_2IrCl_6$ | — | — | — | 0.03 mg |

TABLE 2-continued

| Amount Completed | Water to make 26 ml | Water to make 131 ml | Water to make 280 ml | Water to make 289 ml |
|---|---|---|---|---|

Dye ($d_1$)

Dye ($d_2$)

Sedimenting agent (e)

Antifoggant (f)

Compound (g)

Light-Sensitive Silver Halide Emulsion (3) (for Blue Sensitive Emulsion Layer)

First, addition of solution (2) shown in Table 3 to a well-stirred aqueous solution of 5% gelatin (a solution of 31.6 g of gelatin, 2.5 g of potassium bromide, and 13 mg of compound (a) in 584 ml of water heated at 70° C.) is started. After 10 minutes addition of solution (1) is started. Solutions (1) and (2) are thereafter added for 30 minutes. Five minutes after termination of addition of solution (2), addition of solution (4) shown in Table 3 is further started, and after 10 seconds, addition of solution (3) is started. Solution (3) was added for 27 minutes and 50 seconds, and solution (4) is added for 28 minutes. After washing and salt removal (conducted using sedimenting agent (e') at pH 3.9) by a conventional method, 24.6 g of lime treated ossein gelatin and 56 mg of compound (b) are added to adjust the pH and the pAg to 6.1 and 8.5, respectively. Then 0.55 mg of sodium thiosulfate is added, followed by optimum chemical sensitization at 65° C. Thereafter, 0.35 g of sensitizing dye (h), 56 mg of antifoggant (i), and 2.3 ml of compound (g) as a preservative are added, followed by cooling. Thus, 582 g of a monodisperse octahedral silver bromide emulsion having a mean grain size of 0.55 μm is obtained.

TABLE 3

| | Solution (1) | Solution (2) | Solution (3) | Solution (4) |
|---|---|---|---|---|
| $AgNO_3$ | 15.8 g | 13 | 72.2 g | — |
| $NH_4NO_3$ | 68.0 mg | — | 308 mg | — |
| KBr | — | 11.4 g | — | 52.2 g |
| Amount Completed | Water to make 34 ml | Water to make 134 ml | Water to make 194 ml | Water to make 195 ml |

TABLE 3-continued

Sedimenting Agent (e')

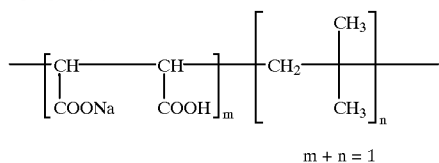

m + n = 1

Dye (h)

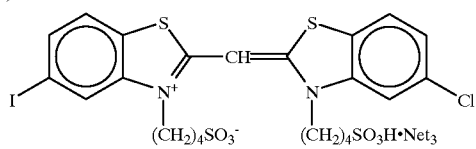

Antifoggant (i)

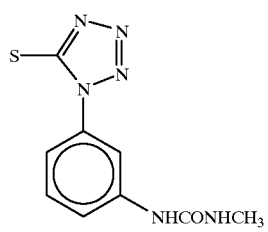

Benzotriazole Silver Emulsion (Organic Silver Salt)

In 300 ml of water, 28 g of gelatin and 13.2 g of benzotriazole are dissolved. The resulting solution was maintained at 40° C. and stirred. A solution of 17 g of silver nitrate in 100 ml of water is added to this solution for 2 minutes. The pH of the resulting benzotriazole silver emulsion is adjusted to remove excess salts by sedimentation. Then the pH is adjusted to 6.30 to obtain 400 g of a benzotriazole silver emulsion.

Method for Preparing Emulsified Dispersions of Couplers

The oil phase ingredients and aqueous phase ingredients shown in Table 4 are each dissolved to form homogeneous solutions having a temperature of 60° C. Both the solutions are combined and dispersed in a 1-liter stainless steel vessel with a dissolver equipped with a 5 cm diameter disperser at 10,000 rpm for 20 minutes. Then hot water is added in amounts shown in Table 4 as post water addition, followed by mixing at 2,000 rpm for 10 minutes. Thus, emulsified dispersions of three colors of cyan, magenta, and yellow are prepared.

TABLE 4

| | | Cyan | Magenta | Yellow |
|---|---|---|---|---|
| Oil Phase | Cyan Coupler (1) | 4.64 g | — | — |
| | Magenta Coupler (2) | — | 3.18 g | — |
| | Yellow Coupler (3) | — | — | 2.96 g |
| | Developing Agent (4) | 1.78 g | 1.78 g | 1.78 g |
| | Antifoggant (5) | 0.08 g | 0.08 g | 0.08 g |
| | igh Boiling Solvent (6) | 4.08 g | 4.85 g | 3.83 g |
| | Ethyl Acetate | 24 ml | 24 ml | 24 ml |
| Aqueous Phase | Lime-Treated Gelatin | 5.0 g | 5.0 g | 5.0 g |
| | Surfactant (7) | 0.40 g | 0.40 g | 0.40 g |
| | Water | 75.0 ml | 75.0 ml | 75.0 ml |
| | Post Water Addition | 60.0 ml | 60.0 ml | 60.0 ml |

TABLE 4-continued

Cyan Coupler (1)

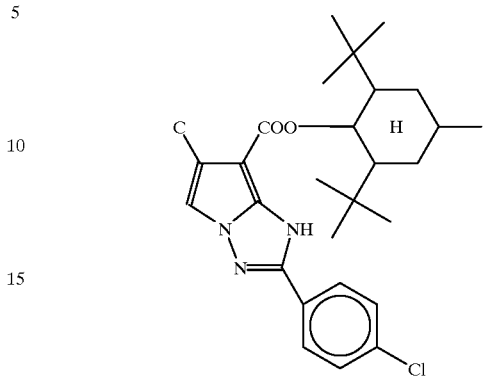

Magenta Coupler (2)

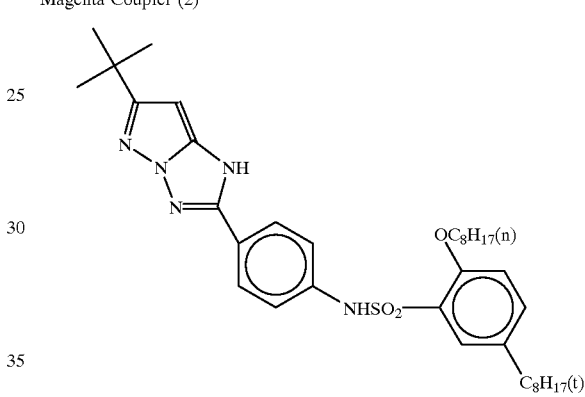

Yellow Coupler (3)

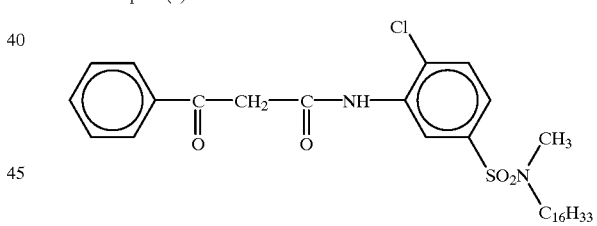

Developing Agent (4)

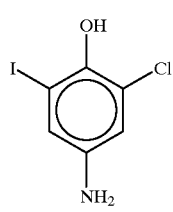

Antifoggant (5)

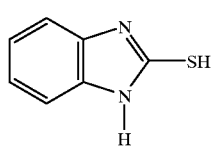

TABLE 4-continued

High Boiling Solvent (6)

$$O=P\left[-O-\underset{}{\bigcirc}-CH_3\right]_3$$

Surfactant (7)

$${}_{12}H_{25}-\underset{}{\bigcirc}-SO_3Na$$

Using the material thus obtained, heat development color photographic material having the multilayer constitution shown in Table 5 is prepared. Annealed polyethylenenapthalate (APEN) containing an effectively transparent coating of magnetic particles suitable for use as a magnetic recording medium is used as a film base. This film is loaded in a thrust cartridge, and the thrust cartridge is inserted into the camera of the invention. A full color test scene is imaged and framed through the viewfinder. The aperture, shutter speed, and flash status are chosen to provide for optimal exposure. The shutter is activated with and without flash activation thereby imagewise exposing successive frames of the thermal film to a full color test scene. The exposed thermal film is thrust along the film path into the accumulator. The magnetic reader reads magnetic information stored on the film. The electronic record of this magnetic information is used to control and modify the thermal processing conditions and the electronic record of the magnetic information is stored in an electronic storage device. The optical writer is calibrated by an optical detector and is used to write a sensitometric table and color patches onto an unexposed region of the thermal film. The temperature of the heater is adjusted and set in accordance to the magnetic information stored on the film. The drive speed is adjusted to provide for a development time in accordance to the magnetic information stored on the film. The film is driven past the heater to effect thermal development. The processed film is then driven past the magnetic writer, which writes magnetic information onto the film. The film is then driven past the illuminated light source of the optical scanner. The light transmitted through the film is reflected by a mirror through a lens system onto a tri-linear CCD array photodetector. Parameters of the photodetector such as relative red green and blue exposure times are adjusted electronically to optimize scanning conditions in response to information stored magnetically on the film. The tri-linear photodetector array faithfully produces an electronic file representation of the sensitometric table written by the optical writer. The electronic file representation of the sensitometric table provided by the optical writer is processed and the data is used to control subsequent optical scanning of image frame information. The resulting image frame information electronic file is manipulated in reference to the data provided by the sensitometric table to correct color and tone scale and the corrected image frame electronic file is output to a digital printer. Inspection of the digital print reveals that the full color image scene is faithfully reproduced by this photothermographic system. The film is rewound into the thrust cartridge and removed from the camera of the invention.

TABLE 5

| Layer Constitution | Material Added | Amount Added (mg/m$^2$) |
| --- | --- | --- |
| 6th Layer | Lime-Treated Gelatin | 1940 |
| Protective Layer | Matte Agent (Silica) | 200 |
| | Surfactant (8) | 50 |
| | Surfactant (9) | 300 |
| | Base Precursor (10) | 1400 |
| | Water-Soluble Polymer (11) | 120 |
| 5th Layer | Lime-Treated Gelatin | 2000 |
| Yellow Color | Blue-Sensitive Silver Halide Emulsion | 1250 (converted to silver) |
| Forming Layer | Benzotriazole Silver Emulsion | 300 (converted to silver) |
| | Yellow Coupler (3) | 600 |
| | Developing Agent (4) | 360 |
| | Antifoggant (5) | 16 |
| | High Boiling Solvent (6) | 774 |
| | Surfactant (7) | 80 |
| | Heat Solvent (12) | 1400 |
| | Surfactant (9) | 70 |
| | Water-Soluble Polymer (11) | 40 |
| 4th Layer | Lime-Treated Gelatin | 970 |
| Intermediate Layer | Surfactant (8) | 50 |
| | Surfactant (9) | 300 |
| | Base Precursor (10) | 1400 |
| | Water-Soluble Polymer (11) | 60 |
| 3rd Layer | Lime-Treated Gelatin | 1000 |
| Magenta Color | Green-Sensitive Silver Halide Emulsion | 625 (converted to silver) |
| Formation Layer | Benzotriazole Silver Emulsion | 150 (converted to silver) |
| | Magenta Coupler (2) | 320 |
| | Developing Agent (4) | 180 |
| | Antifoggant (5) | 8 |
| | High Boiling Solvent (6) | 490 |
| | Surfactant (7) | 40 |
| | Heat Solvent (12) | 700 |
| | Surfactant (9) | 35 |
| | Water-Soluble Polymer (11) | 20 |

TABLE 5-continued

| | | |
|---|---|---|
| 2nd Layer | Lime-Treated Gelatin | 970 |
| Intermediate Layer | Surfactant (8) | 50 |
| | Surfactant (9) | 300 |
| | Base Precursor (10) | 1400 |
| | Water-Soluble Polymer (11) | 60 |
| 1st Layer | Lime-Treated Gelatin | 1000 |
| Cyan Color | Red-Sensitive Silver Halide Emulsion | 625 (converted to silver) |
| Formation Layer | Benzotriazole Silver Emulsion | 150 (converted to silver) |
| | Cyan Coupler (1) | 470 |
| | Developing Agent (4) | 180 |
| | Antifoggant (5) | 8 |
| | High Boiling Solvent (6) | 410 |
| | Surfactant (7) | 40 |
| | Heat Solvent (12) | 700 |
| | Surfactant (9) | 35 |
| | Water-Soluble Polymer (11) | 20 |
| Transparent PET Base (102 μm) | | |

Surfactant (8)

$$NaO_3S-CH(-C(=O)-OC_8H_{17})-CH_2-C(=O)-OC_8H_{17}$$

Surfactant (9)

$$C_9H_{19}-C_6H_4-O(CH_2CH_2O)_{8.5}H$$

Base Precursor (10)

$$H_3C-C(=O)-O^-\quad NH_2-C(=NH)-NH_2$$ (guanidine)

Water-Soluble Polymer (11)

$$-(CH_2-CH(-C_6H_4-SO_3K))-$$

Heat Solvent (12)
D-Sorbitol

In another example, the above-described thermal film is first exposed in a conventional camera. The cartridge containing the exposed thermal film is removed from that conventional camera and inserted into the camera of the invention, where it is thermally processed as described above. This example illustrates that the camera of the invention can be employed as a convenient and highly mobile processor.

In another example, the above-described thermal film is loaded into camera of the invention and the camera body sealed to provide a one-time-use camera and processor. After exposure of images as above, external power is supplied to the camera and the images are developed as otherwise described. The camera body is deformed to remove the film bearing the developed images, and the images are scanned. This example illustrates that the camera of the invention can be employed as a one-time-use camera with power and control of development provided at a remote location. The deformed camera body can then be returned to a manufacturer for reuse and recycling. This embodiment is especially useful for highly distributed imaging and photofinishing in that it combines the benefits of easy and convenient imaging and photo-processing with the benefits of an inexpensive and renewable camera while eliminating the need for co-packaging a power supply with the camera.

The invention has been described in detail with particular reference to certain preferred embodiments thereof, but it will be understood that variations and modifications can be effected within the spirit and scope of the invention.

What is claimed is:

1. An image capture and thermal development camera comprising a chamber for unexposed thermal film, drive means to advance a film from said chamber, an accumulator to gather a film after it has left said chamber, a heater adapted to develop a thermal film, said heater located between said chamber and said accumulator, a lens and shutter positioned to and suitable for exposing a film before thermal development, a scanner positioned to and suitable for scanning an image from an exposed and developed film, and a display suitable for displaying a scanned image.

2. The camera of claim 1 wherein said camera further comprises batteries.

3. The camera of claim 1 wherein said camera is powered by an external source.

4. The camera of claim 1 wherein said camera further comprises means for advancing said thermal film one frame at a time.

5. The camera of claim 1 wherein said camera further includes scene illumination means.

6. The camera of claim 1 wherein said camera further comprises aperture control means.

7. The camera of claim 1 wherein said camera further comprises shutter control means.

8. The camera of claim 1 wherein said camera further comprises film exposure format control means.

9. The camera of claim 1 further comprising temperature sensing means to determine the temperature of said heater.

10. The camera of claim 9 further comprising means to regulate the temperature of said heater and the speed of said drive means.

11. The camera of claim 1 wherein said camera comprises a connector suitable for channeling power to said camera.

12. The camera of claim 1 wherein said camera comprises a connector suitable for channeling control logic to said camera.

13. The camera of claim 1 wherein said camera further comprising a magnetic reader.

14. The camera of claim 1 wherein said camera further comprises a magnetic writer.

15. The camera of claim 1 wherein said camera further comprises an optical writer.

16. The camera of claim 1 further comprising means to utilize recorded information to aid in optimal exposure of said thermal film.

17. The camera of claim 1 wherein said camera further comprises means to record to memory exposure conditions as exposure takes place through the lens.

18. The camera of claim 17 further comprising means to write exposure conditions to said film.

19. The camera of claim 17 further comprising means to utilize information recorded during exposure to aid in processing of said film.

20. The camera of claim 1 further comprising means to utilize recorded information to aid in optical scanning or processing of said film.

21. The camera of claim 1 wherein said chamber is adapted for receiving a film cartridge containing a thermal film in roll form.

22. The camera of claim 1 wherein said chamber is adapted for receiving a film cassette, said cassette containing a thermal film in roll form.

23. The camera of claim 1 wherein said chamber is adapted for receiving a thrust cartridge containing a thermal film in roll form.

24. The camera of claim 1 wherein said camera is preloaded with a thermal film.

* * * * *